United States Patent
Ishikawa et al.

(10) Patent No.: US 7,432,985 B2
(45) Date of Patent: Oct. 7, 2008

(54) IMAGE PROCESSING METHOD

(75) Inventors: Hisashi Ishikawa, Chiba (JP); Makoto Fujiwara, Tokyo (JP); Masao Kato, Kanagawa (JP); Tetsuya Suwa, Kanagawa (JP); Fumitaka Goto, Tokyo (JP); Kazuya Imafuku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 10/809,526

(22) Filed: Mar. 26, 2004

(65) Prior Publication Data

US 2004/0196408 A1    Oct. 7, 2004

(30) Foreign Application Priority Data

Mar. 26, 2003  (JP) .............................. 2003-085372
Mar. 31, 2003  (JP) .............................. 2003-097187

(51) Int. Cl.
*H04N 5/21* (2006.01)
*H04N 5/213* (2006.01)

(52) U.S. Cl. .............. 348/616; 348/E5.77; 348/E5.079; 375/E7.019; 382/268; 382/275

(58) Field of Classification Search ................. 382/275, 382/268; 348/616
See application file for complete search history.

(56) References Cited

U.S. PATENT DOCUMENTS

| | | | | |
|---|---|---|---|---|
| 5,327,246 | A | 7/1994 | Suzuki | 348/246 |
| 5,436,981 | A | 7/1995 | Ishikawa | 382/173 |
| 5,933,513 | A | 8/1999 | Yoneyama et al. | 382/106 |
| 6,084,984 | A | 7/2000 | Ishikawa | 382/173 |
| 6,496,605 | B1 | 12/2002 | Osa | 382/268 |
| 2002/0150302 | A1* | 10/2002 | McCarthy et al. | 382/254 |
| 2002/0191858 | A1* | 12/2002 | Sindhu | 382/261 |
| 2003/0053708 | A1* | 3/2003 | Kryukov et al. | 382/261 |

FOREIGN PATENT DOCUMENTS

| | | |
|---|---|---|
| JP | 57-127364 | 8/1982 |
| JP | 64-47167 | 2/1989 |

(Continued)

OTHER PUBLICATIONS

Japanese Office Action, dated Jun. 11, 2007, regarding Application No. 2003-085372.

(Continued)

*Primary Examiner*—Samir A Ahmed
*Assistant Examiner*—Stephen R Koziol
(74) *Attorney, Agent, or Firm*—Fitzpatrick, Cella, Harper & Scinto

(57) ABSTRACT

Pixels in a window, which corresponds to the position of an input pixel and has a predetermined size, are extracted from a reduced image obtained by reducing an input image to a predetermined scale. Substitute data used to substitute the value of the input pixel is generated based on the extracted pixels in the window. The difference value between the substitute data and input pixel value is calculated and is compared with a first threshold value. When the difference value is smaller than the first threshold value, the input pixel value is substituted by the substitute data. Thus, low-frequency noise reduction can be attained using a minimum required memory size while suppressing adverse effects such as a resolution drop and the like.

7 Claims, 27 Drawing Sheets

FOREIGN PATENT DOCUMENTS

| | | |
|---|---|---|
| JP | 1-156069 | 6/1989 |
| JP | 2-62164 | 3/1990 |
| JP | 2-208068 | 8/1990 |
| JP | 4-235472 A | 8/1992 |
| JP | 4-239886 A | 8/1992 |
| JP | 7-75103 A | 3/1995 |
| JP | 7-203210 A | 8/1995 |
| JP | 7-219494 | 8/1995 |
| JP | 8-56357 A | 2/1996 |
| JP | 9-247449 | 9/1997 |
| JP | 9-298682 | 11/1997 |
| JP | 10-98722 A | 4/1998 |
| JP | 11-39480 | 2/1999 |
| JP | 11-328386 | 11/1999 |
| JP | 2000-245179 A | 9/2000 |
| JP | 2000-295497 | 10/2000 |
| JP | 3161427 B2 | 4/2001 |
| JP | 2002-335400 | 11/2002 |
| JP | 2004-015322 A | 1/2004 |
| WO | WO00/38309 | 6/2000 |

OTHER PUBLICATIONS

Japanese Office Action, dated Sep. 18, 2007, regarding Application No. 2003-085372.

* cited by examiner

|  |  |  |
|---|---|---|
|  |  |  |
|  | 75 |  |
|  |  |  |

FIG. 27C

|  |  |  |
|---|---|---|
| 0.25 | 0.25 | 0.25 |
| 0.25 | 1 | 0.25 |
| 0.25 | 0.25 | 0.25 |

FIG. 27B

|  |  |  |
|---|---|---|
| 82 | 70 | 78 |
| 68 | 77 | 66 |
| 80 | 72 | 76 |

FIG. 27A

IMAGE PROCESSING METHOD

FIELD OF THE INVENTION

The present invention relates to a technique for reducing noise of an input multi-valued image.

BACKGROUND OF THE INVENTION

Conventionally, a technique for removing noise components from a digital image on which noise components that are different from signal components are superposed has been studied. The characteristics of noise are diverse depending on their generation factors, and noise removal methods suited to those characteristics have been proposed. For example, when an image input device such as a digital camera, image scanner, or the like is assumed, noise components are roughly categorized into noise which depends on the input device characteristics of a solid-state image sensing element or the like and input conditions such as an image sensing mode, scene, or the like, and has already been superposed on a photoelectrically converted analog original signal, and noise which is superposed via various digital signal processes after the analog signal is converted into a digital signal via an A/D converter.

As an example of the former, impulse noise that generates an isolated value to have no correlation with surrounding image signal values, noise resulting from the dark current of the solid-state image sensing element, and the like are known. As an example of the latter, noise components are amplified simultaneously with signal components when a specific density, color, and the like are emphasized in various correction processes such as gamma correction, gain correction for improving the sensitivity, and the like, thus increasing the noise level. As an example of deterioration due to a digital signal process, since an encoding process using a JPEG algorithm extracts a plurality of blocks from two-dimensional (2D) image information, and executes orthogonal transformation and quantization for respective blocks, a decoded image suffers block distortion that generates steps at the boundaries of blocks.

In addition to various kinds of noise mentioned above, a factor that especially impairs the image quality is noise (to be referred to as "low-frequency noise" hereinafter) which is generated in a low-frequency range and is conspicuously observed in an image sensed by a digital camera or the like. This low-frequency noise often results from the sensitivity of a CCD or CMOS sensor as a solid-state image sensing element. In an image sensing scene such as a dark scene with a low signal level, a shadowy scene, or the like, low-frequency noise is often emphasized due to gain correction that raises signal components irrespective of poor S/N ratio. Furthermore, the element sensitivity of the solid-state image sensing element depends on its chip area. Hence, in a digital camera which has a large number of pixels within a small area, the amount of light per unit pixel consequently decreases, and the sensitivity lowers, thus producing noise. Such low-frequency noise is often visually recognized as pseudo speckle texture across several to ten-odd pixels on a flat portion such as a sheet of blue sky or the like. Some digital cameras often produce false colors.

As a conventionally proposed noise removal method, a method using a median filter, and a method using a low-pass filter (to be abbreviated as LPF hereinafter) that passes only a low-frequency range through it are prevalent.

As the method using a median filter, many methods such as a method which extracts a pixel value which assumes a median (central value) from those of a pixel of interest and its surrounding pixels, and replaces the pixel value of interest by the extracted value (for example, see patent reference 1: Japanese Patent Laid-Open No. 4-235472) and the like have been proposed. If the pixel of interest is impulse noise or random noise, the median filter can replace the value of the pixel of interest, which is an isolated value having low correlation with surrounding pixels, by a median having high correlation, thus removing the isolated value produced in original information.

The method using an LPF calculates the weighted mean using the pixel values of a pixel of interest and its surrounding pixels, and replaces the pixel value of interest by the calculated weighted mean, as shown in, e.g., FIG. 27. This method is mainly effective for the aforementioned block distortion and the like. Since block distortion is noise that generates block-like steps which are different from signal components in a flat region, these steps can become hard to be visually recognized by moderating the slope of the steps.

Note that the aforementioned two methods are locally effective, but blur an edge portion. For this reason, many modifications of these methods have been proposed. For example, a method that makes product sum calculations by selecting only surrounding pixels which have pixel values approximate to that of the pixel of interest upon calculating the weighted mean, so as to prevent any blur due to a filter process (for example, see patent reference 2: Japanese Patent Laid-Open No. 2000-245179) has been proposed.

In addition to the aforementioned method using a median filter and the method using an LPF, many proposals for removing noise and distortion have been made. For example, in order to remove block distortion, a method that exchanges signal values between pixels which are located on the two sides of a block boundary, (for example, see patent reference 3: Japanese Patent Laid-Open No. 8-56357) and a method that adds a predetermined pattern, which is selected from a plurality of patterns using a random number, to pixel signal levels around a block boundary (for example, see patent reference 4: Japanese Patent Laid-Open No. 10-98722) have been disclosed. Also, a method that removes block distortion which is produced upon encoding by adding an error to the level value of a specific pixel of interest having a block boundary as the center (for example, see patent reference 5: Japanese Patent Laid-Open No. 7-75103), and a method that removes noise by detecting maximum and minimum values from neighboring pixels of a pixel of interest and selecting one of the maximum value, minimum value, and value of the pixel of interest in accordance with a determination result indicating if noise is contained as a control signal, so as to remove white and black points that assume isolated values (for example, see patent reference 6: Japanese Patent Laid-Open No. 4-239886) have been disclosed.

In recent years, image processes such as noise removal are normally executed using a host computer such as a personal computer (PC). Recently, however, a recording apparatus (direct recording apparatus) which executes image processes by itself without any host computer, and prints images (for example, see patent reference 7: Japanese Patent No. 3161427) is also available.

However, none of the above prior arts are effective for low-frequency noise such as speckle noise or the like. Especially, the method using a median filter provides only an effect of removing an isolated value having low correlation with surrounding pixel values, and the method using an LPF is effective for only high-frequency noise or random white noise, since it cuts off a high-frequency range. Hence, low-frequency noise cannot be reduced.

The method of patent reference 3 that aims at removal of block distortion can expect an effect of eliminating steps by a method based on random number addition and a method that exchanges pixel values between blocks, as long as a block boundary is known, since the block distortion is high-frequency components produced as rectangular steps. However, low-frequency noise is coupled noise in which pixel values having nearly no change continuously appear over a broad range from several pixels to ten-odd pixels, and the block distortion reduction technique cannot be directly applied. Of course, position information of noise is not known unlike a block boundary upon block encoding.

Since the aforementioned method based on random number addition applies a pixel value which is not present in surrounding pixels, if a random number is added to each of color-separated color components in a color image, a new color which is not present in surrounding pixels is generated, thus causing deterioration of image quality such as false color generation and the like.

Note that a method which reduces electric power of a specific frequency (for example, see patent reference 8: Japanese Patent Laid-Open No. 7-203210) has been disclosed, although its purpose is different from the aforementioned noise removal. In a system which inputs a dot pattern document and executes dithering of a pseudo halftone process upon outputting an image, moiré is generated due to interference between the frequency of the input dot pattern and dithering frequency. In order to prevent generation of such moiré, the invention described in patent reference 8 discloses a moiré removal method that removes the frequency of the input dot pattern in advance. In order to remove the frequency of the dot pattern, it is effective to disturb a predetermined regularity. Hence, in this method, the value of a pixel of interest is exchanged by a pixel value which is located the predetermined number of pixels ahead of the pixel of interest in one dimension. In the above disclosure, the predetermined number of pixels is either fixed or randomly selected.

However, this moiré removal method is not effective for low-frequency noise which is produced broadly in a low-frequency range since it aims at disturbing a specific period corresponding to a peak. Also, exchange of pixel values can preserve the density, but it merely spatially shift pixel phases since the selected pixel value is also changed. A change in selected pixel value corresponds to cyclic filter characteristics, and an impulse response becomes infinite. Even when the predetermined number of pixels as the distance between the pixels to be exchanged is randomly selected, since sampled pixels are exchanged in turn, the moiré period is merely shifted by shifting the phase of the peak of the dot pattern, which is generated at a specific period.

That is, none of the inventions described in the above patent references can effectively reduce noise produced in a low-frequency range.

A method of effectively reducing noise produced in a low-frequency range is disclosed in, e.g., patent reference 9: Japanese Patent Application No. 2002-164625. In this method, a pixel is selected from a window that refers to a pixel of interest and its surrounding pixels of an input image, and a new pixel value is determined based on the selected pixel and the pixel of interest, thus outputting the new pixel value. Hence, this method can effectively reduce noise produced in a low-frequency range.

However, upon practicing the invention of patent reference 9 in the aforementioned direct recording apparatus that records without any host computer, the cost often increases since a larger memory size is required. The invention of patent reference 9 requires a larger memory size as the number of surrounding pixels to be referred to increases, since it refers to a pixel of interest and its surrounding pixel of an input image. Since the direct recording apparatus has a smaller memory size than a host computer, the invention of patent reference 9 occupies a larger memory area when it is practiced. In some cases, an increase in memory size is required.

SUMMARY OF THE INVENTION

The present invention has been made to solve the aforementioned problems, and has as its object to reduce low-frequency noise while suppressing adverse effects such as a resolution drop and the like.

In order to achieve the above object, according to one aspect of the present invention, there is provided an image processing method comprising:

a step of obtaining an image of a predetermined scale from an input image;

a step of extracting, from the obtained image, pixels in a window which corresponds to a position of an input pixel and has a predetermined size;

a step of generating substitute data used to substitute a value of the input pixel on the basis of the extracted pixels in the window;

a step of calculating a difference value between the substitute data and the input pixel value;

a step of comparing the difference value with a first threshold value; and a step of substituting, when the difference value is less than the first threshold value, the input pixel value by the substitute data.

According to one aspect of the present invention, there is provided an image processing method comprising:

a step of obtaining an image by converting an input image to a predetermined scale;

a step of extracting, from the obtained image, pixels in a window which corresponds to a position of an input pixel and has a predetermined size;

a step of generating a plurality of substitute data used to substitute a value of the input pixel on the basis of the extracted pixels in the window;

a step of categorizing the input pixel to one of a plurality of categories;

a step of selecting one of the plurality of substitute data in accordance with the category;

a step of calculating a difference value between the selected substitute data and the input pixel value;

a step of comparing the difference value with a first threshold value; and a step of substituting, when the difference value is less than the first threshold value, the input pixel value by the selected substitute data.

According to one aspect of the present invention, there is provided an image processing apparatus comprising:

means for obtaining an image of a predetermined scale from an input image;

means for extracting, from the obtained image, pixels in a window which corresponds to a position of an input pixel and has a predetermined size;

means for generating substitute data used to substitute a value of the input pixel on the basis of the extracted pixels in the window;

means for calculating a difference value between the substitute data and the input pixel value;

means for comparing the difference value with a first threshold value; and means for, when the difference value is less than the first threshold value, substituting the input pixel value by the substitute data.

According to one aspect of the present invention, there is provided an image processing apparatus comprising:

means for obtaining an image by converting an input image to a predetermined scale;

means for extracting, from the obtained image, pixels in a window which corresponds to a position of an input pixel and has a predetermined size;

means for generating a plurality of substitute data used to substitute a value of the input pixel on the basis of the extracted pixels in the window;

means for categorizing the input pixel to one of a plurality of categories;

means for selecting one of the plurality of substitute data in accordance with the category;

means for calculating a difference value between the selected substitute data and the input pixel value;

means for comparing the difference value with a first threshold value; and means for, when the difference value is less than the first threshold value, substituting the input pixel value by the selected substitute data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 27A to 27C are views for explaining blocks of an input image and a filter process.

DETAILED DESCRIPTION OF THE PREFERRED EMBODIMENTS

Preferred embodiments of the present invention will be described in detail hereinafter with reference to the accompanying drawings. Embodiments to be described hereinafter provide disclosures that allow easy practice by those who are skilled in the art of the present invention, and are merely some of embodiments which are included in the technical scope of the present invention specified by the scope of the claims.

Therefore, it is obvious for those who are skilled in the art that embodiments which are not directly described in this specification are included in the technical scope of the present invention as long as they have a common technical idea.

Note that a plurality of embodiments will be described for the sake of simplicity. It is easy to understand for those who are skilled in the art that not only these embodiments are independently realized as inventions, but also an invention is realized by appropriately combining a plurality of embodiments.

First Embodiment

Figure 1:
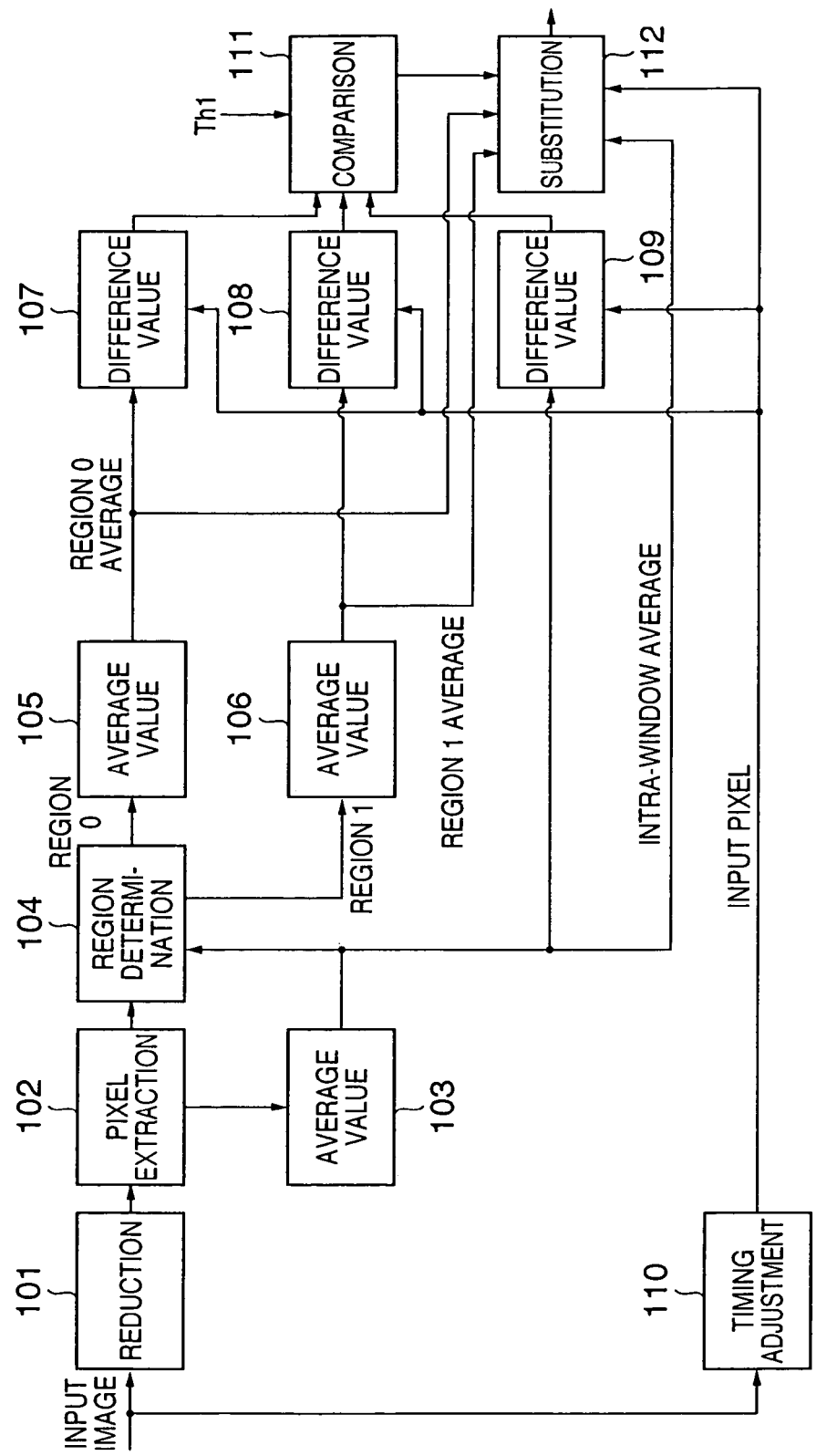
FIG. 1 is a block diagram showing the arrangement of an image processing apparatus according to the first embodiment.

FIG. 1 is a block diagram showing the arrangement of an image processing apparatus according to the first embodiment. Referring to FIG. 1, reference numeral 101 denotes an image reduction unit, which reduces an input image to a predetermined scale (e.g., ¼). Reference numeral 102 denotes a pixel extraction unit, which extracts pixels to an n×m (m and n are integers) rectangular pattern (window) having an input pixel position as the center from the reduced image. Reference numeral 103 denotes an intra-window average value calculation unit, which generates an average value of the extracted pixel values in the window. Reference numeral 104 denotes a region determination unit which compares, e.g., downsize pixel values in the window with the intra-window average value, and determines that pixels whose pixel values are equal to or smaller than the intra-window average value belong to region 0, or determines that other pixels belong to region 1. Reference numeral 105 denotes a region 0 average value calculation unit, which generates an intra-window average value of pixels which are determined as those in region 0 by the region determination unit 104. Reference numeral 106 denotes a region 1 average value calculation unit, which generates an intra-window average value of pixels which are determined as those in region 1 by the region determination unit 104.

Reference numeral 110 denotes a timing adjustment unit which delays an input image (pixel of interest) by a time corresponding to latency in respective processing units. Reference numeral 107 denotes a region 0 difference value generation unit, which generates a difference absolute value between the output from the region 0 average value calculation unit 105 and the input image (pixel of interest) which is delay-compensated by the timing adjustment unit 110. Reference numeral 108 denotes a region 1 difference value generation unit, which generates a difference absolute value between the output from the region 1 average value calculation unit 106 and the input image (pixel of interest) which is delay-compensated by the timing adjustment unit 110. Reference numeral 109 denotes an intra-window difference value generation unit, which generates a difference absolute value between the output from the intra-window average value calculation unit 103 and the input image (pixel of interest) which is delay-compensated by the timing adjustment unit 110. Reference numeral 111 denotes a comparison unit which controls a pixel substitution unit 112 to select a smallest average value, which is smaller than a threshold value Th1, from the difference absolute values output from the three difference value generation units 107, 108, and 109. If none of difference absolute values are smaller than the threshold value Th1, the comparison unit 111 controls the pixel substitution unit 112 to select the input image (pixel of interest). The pixel substitution unit 112 substitutes an input pixel value by the average value that meets the above condition only when the minimum difference absolute value smaller than the threshold value Th1 is present.

A process for converting an input image into blocks, and substituting a pixel of interest in a block of interest on the basis of a predetermined condition in the image processing apparatus with the above arrangement will be explained below.

Figure 2:
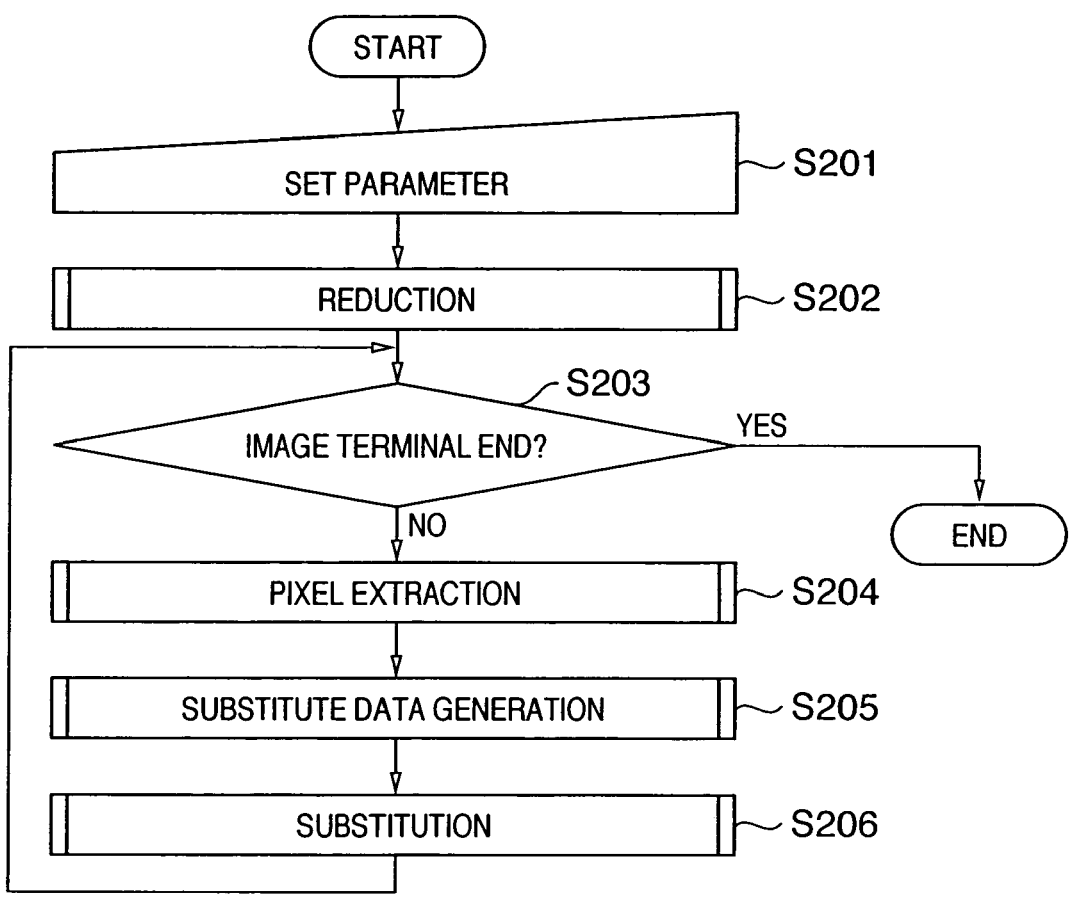
FIG. 2 is a flow chart showing the process of the image processing apparatus according to the first embodiment.

FIG. 2 is a flow chart showing the process of the image processing apparatus in the first embodiment. In step S201, a CPU (not shown) sets parameters required for respective processes. Note that parameters to be set include an image reduction scale, block size, window size, and threshold value, which are determined in correspondence with an input image and nature of noise to be removed. The parameters may be determined by analyzing an input image, or values which are determined in advance based on the property or output condition of an input image may be set. When constant values are always set as the parameters, this parameter setting step is skipped.

In step S202, the image reduction unit 101 reduces an input image to a predetermined reduction scale. With this reduction process, the number of pixels (window size) for low-frequency noise removal (to be described later) is decreased. When a smaller reduction scale is set (to set a smaller output size), the window size in the subsequent process can be decreased. However, since the degree of influence near an input pixel decreases, not only a difference from the input pixel becomes large, and the number of pixels to be substituted decreases, but also jaggy-like disturbance due to ON/OFF of substitution appears at an edge portion. On the other hand, when a larger reduction scale is set (to set a larger output size), since the window size in the subsequent process does not decrease, the processing amount increases. Hence, in the description of the first embodiment, the reduction scale is set to be ¼.

Upon completion of image reduction, the flow advances to step S203 to check if the image has been processed up to its terminal end. If YES in step S203, the process ends; otherwise, the flow advances to step S204, and the pixel extraction unit 102 extracts reduced pixel data in a predetermined pattern (window) having a reduced pixel corresponding to the position of the input pixel (pixel of interest) as the center. This window corresponds to a tap (window) of a two-dimensional FIR filter, and shifts upon movement of the position of an input pixel (pixel of interest). Since the reduction scale is ¼, as described above, if a reduced pixel is generated from 4×4 blocks, the window shifts one pixel in the horizontal direction when an input pixel moves four pixels in the horizontal direction. Also, when an input pixel moves four lines in the vertical direction, the window shifts one line in the vertical direction. That is, when an input pixel moves and a reduced pixel corresponding to the input pixel shifts one pixel, the window also shifts one pixel.

If the window size=4×4 and the reduction scale=¼, this window corresponds to a 16×16 window on an original input image, and is effective to eliminate speckle noise to a maximum of an 8×8 size. In the following description, the window size is 4×4.

In step S205, substitute data is generated from the extracted pixels in the window. Note that this process is done by the intra-window average value calculation unit 103, region determination unit 104, region 0 average value calculation unit 105, region 1 average value calculation unit 106, region 0 difference value generation unit 107, region 1 difference value generation unit 108, intra-window difference value generation unit 109, and comparison unit 111, as will be described in detail below.

Figure 3:
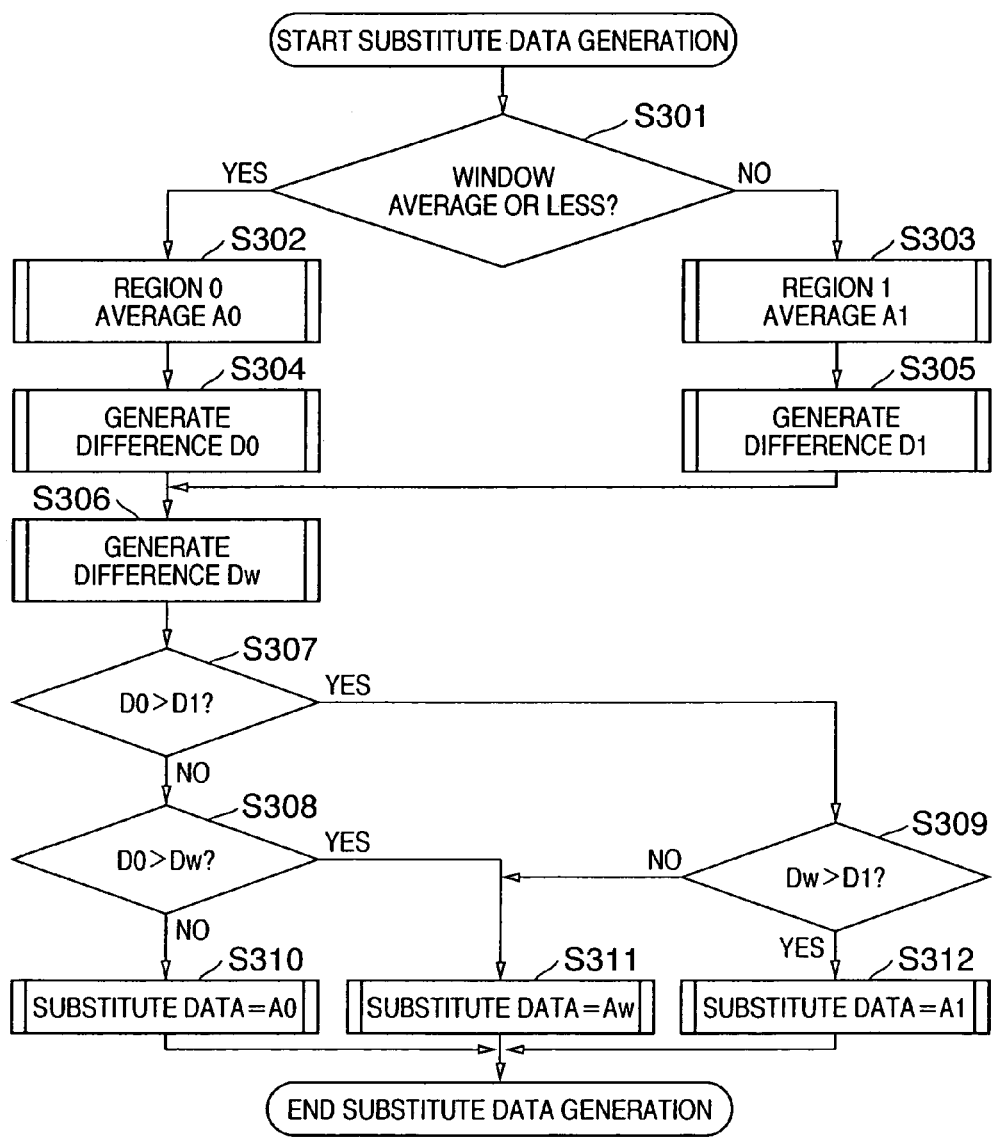
FIG. 3 is a flow chart showing a substitute data generation process in the first embodiment.

FIG. 3 is a flow chart showing a substitute data generation process in the first embodiment. The region determination unit 104 determines in step S301 if pixels in the window belong to region 0 or 1. More specifically, the intra-window average value calculation unit 103 calculates an average of the pixel values in the window, and the region determination unit 104 compares the pixel values in the window with the window average value. If the pixel values are equal to or smaller than the window average value, the region determination unit 104 determines that they belong to region 0; otherwise, region 1. If the pixels belong to region 0, the flow advances to step S302, and the region 0 average value calculation unit 105 calculates the average value of the pixels. On the other hand, if the pixels belong to region 1, the flow advances to step S303, and the region 1 average value calculation unit 106 calculates the average value of the pixels. In step S304 or S305, the region 0 difference value generation unit 107 or region 1 difference value generation unit 108 calculates a difference absolute value D0 or D1 between the average value of each region and an input pixel value.

In step S306, the intra-window difference value generation unit 109 calculates a difference absolute value Dw between the window average value and the input pixel value. In steps S307 to S309, the comparison unit 111 compares the difference absolute values D0 and D1 between the average values of the respective regions and the input pixel value, and the difference absolute value Dw between the window average value and input pixel value in turn. As a result, an average value as a smallest difference absolute value (smallest difference absolute value D) is determined as substitute data (steps S310 to S312).

That is, if the difference absolute value D0 of region 0 is smallest, an average value A0 calculated by the region 0 average value calculation unit 105 is determined as substitute data. Likewise, if the difference absolute value D1 of region 1 is smallest, an average value A1 calculated by the region 1 average value calculation unit 106 is determined as substitute data. Furthermore, if the intra-window difference value Dw is smallest, an average value Aw calculated by the intra-window average value calculation unit 103 is determined as substitute data.

Referring back to FIG. 2, in step S206 if a predetermined condition is satisfied for the aforementioned smallest difference absolute value D the comparison unit 111 and pixel substitution unit 112 substitute the input pixel value by the generated substitute data, and output the substituted data; otherwise, they directly output the input pixel value. After the above process is repeated to the terminal end of the input image (YES in step S203), this process ends.

Figure 4:
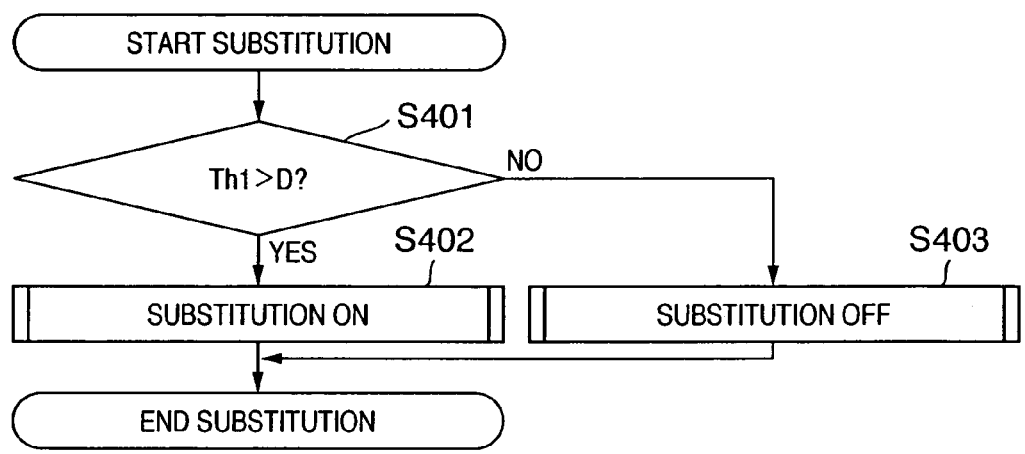
FIG. 4 is a flow chart showing a substitution process in the first embodiment.

FIG. 4 is a flow chart showing the substitution process in the first embodiment. In step S401, the comparison unit 111 compares the smallest difference absolute value D with a threshold value Th1. If the smallest difference absolute value D is smaller than the threshold value Th1, the flow advances to step S402, and the pixel substitution unit 112 outputs substitute data. On the other hand, if the smallest difference absolute value D is equal to or larger than the threshold value Th1, the flow advances to step S403, and the input pixel value is output.

With the series of processes mentioned above, the average value corresponding to the smallest difference absolute value which is smaller than the threshold value Th1 of the calculated difference absolute values is selected as substitute data to substitute an input pixel, thus removing noise.

As described above, upon eliminating speckle noise to a maximum of an 8×8 size, if a reduced image is not used, a 16×16 window is required. In this case, if W represents the number of pixels in the horizontal direction, the required line memory size is 15W. However, since the first embodiment uses a ¼ reduced image, the required line memory size is 3 lines×(¼)W=(¾)W, and is reduced to ¹⁄₂₀.

As described above, according to the first embodiment, noise and a significant signal are separated by comparing an average value and input pixel value, and a noise removal effect is effective to lower frequency components by generating substitute data from the reduced image. Also, the number of substitute pixels near an edge is increased using a region-dependent average value, the effective range of the noise removal effect can be broadened, and a higher noise removal effect can be obtained by a simple operation without any adverse effects.

In the first embodiment, a pixel average in the window is used to determine a region. However, the present invention is not limited to such specific process. For example, the value of a pixel which is located at the center upon arranging pixels in the window in descending order of pixel value, or the median of a pixel range in the window may be used. Also, the second largest or smallest value may be used as a substitute pixel candidate in place of the average value of each region.

Second Embodiment

The second embodiment of the present invention will be described in detail hereinafter with reference to the accompanying drawings.

In the second-embodiment, in a window in which the difference between the average values of two regions is small, an intra-window average value is determined as substitute data.

Figure 5:
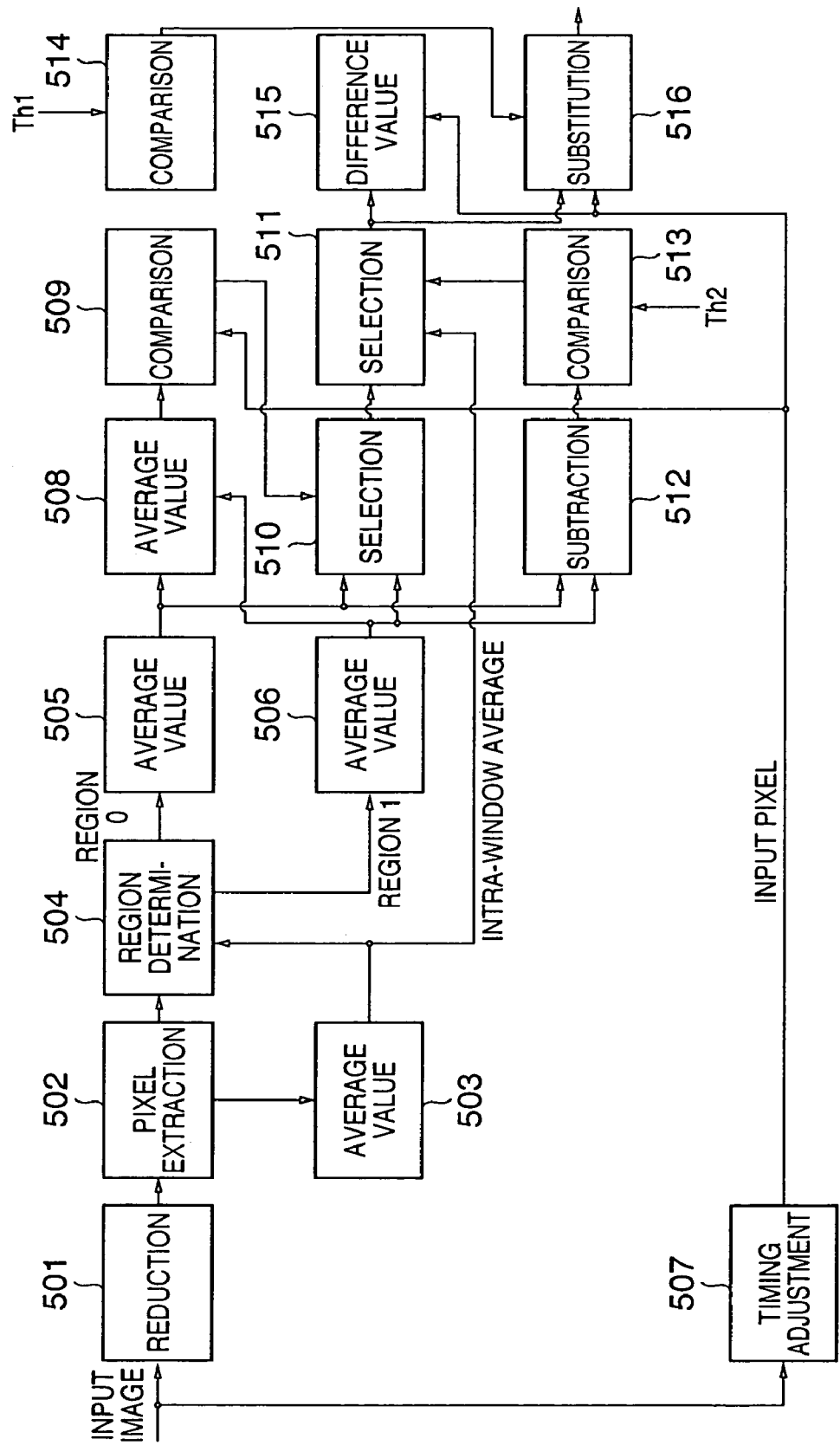
FIG. 5 is a block diagram showing the arrangement of an image processing apparatus according to the second embodiment.

FIG. 5 is a block diagram showing the arrangement of an image processing apparatus according to the second embodiment. Referring to FIG. 5, reference numerals 501 to 506 and 507 denote units which execute the same processes as those of the units 101 to 106 and 110 shown in FIG. 1 in the first embodiment, and a detailed description thereof will be omitted. Reference numeral 508 denotes an average value calculation unit; 509, 513, and 514, comparison units; 510 and 511, selection units; 512, a subtraction unit; 515, a difference value generation unit; and 516, a pixel substitution unit. Only differences from the first embodiment will be explained below.

The average value calculation unit 508 calculates an average value of those of regions 0 and 1. That is, let A0 be the average value of region 0, and A1 be that of region 1. Then, an average value A01 of regions 0 and 1 is given by A01=(A0+A1)/2. The comparison unit 509 compares the average value A01 of regions 0 and 1 with an input pixel value Pi. If the input pixel value Pi is smaller than the average value A01 of regions 0 and 1, the selection unit 510 outputs the average value A0 of region 0; otherwise, it outputs the average value A1 of region 1. More specifically, the selection unit 510 selects the average value closer to the input pixel value Pi. The subtraction unit 512 calculates a difference D10 between the average values of regions 0 and 1, and the comparison unit 513 compares the difference D10 with a threshold value Th2. If the difference D10 is equal to or smaller than the threshold value Th2, the selection unit 511 outputs an intra-window average value Aw; otherwise, it outputs the output from the selection unit 510, i.e., the average value closer to the input pixel value Pi. That is, the output from the selection unit 511 is used as substitute data. Since A1>A0, the difference D10 between the average values of regions 0 and 1 is calculated by D10=A1−A0.

The difference value generation unit 515 generates a difference absolute value Dt between the input pixel value Pi and the output (substitute data) from the selection unit 511. The comparison unit 514 compares this difference absolute value Dt with a threshold value Th1. Only when the difference absolute value Dt is smaller than the threshold value Th1, the pixel substitution unit 516 substitutes the input pixel value Pi by the output (substitute data) from the selection unit 511. Otherwise, the pixel substitution unit 516 outputs the input pixel value Pi intact.

The process of the image processing apparatus in the second embodiment will be described below. Since the second embodiment executes the same processes as those in steps S201 to S204 in FIG. 2 in the first embodiment, a substitute data generation process (S205) and substitution process (S206) will be described in detail below.

Figure 6:
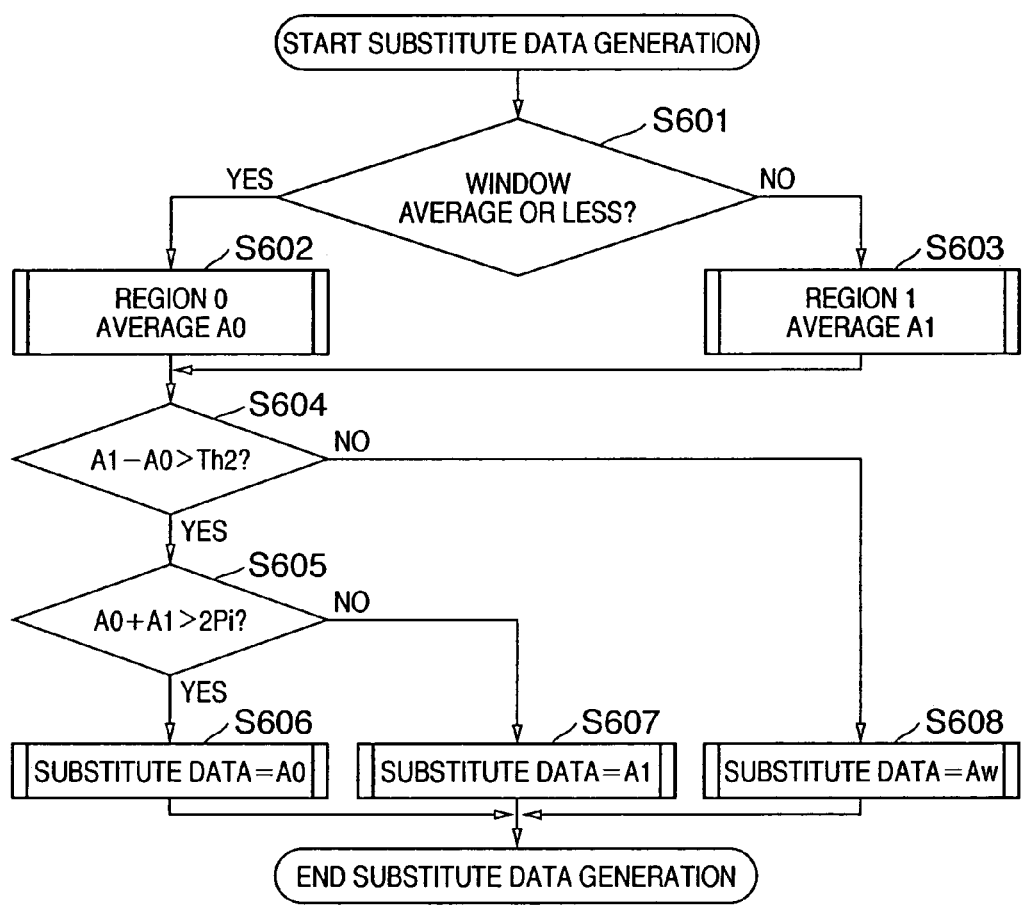
FIG. 6 is a flow chart showing a substitute data generation process in the second embodiment.

FIG. 6 is a flow chart showing a substitute data generation process in the second embodiment. The region determination unit 504 determines in step S601 if pixels in the window belong to region 0 or 1. More specifically, the intra-window average value calculation unit 503 calculates an average of the pixel values in the window, and the region determination unit 504 compares the pixel values in the window with the window average value. If the pixel values are equal to or smaller than the window average value, the region determination unit 504 determines that they belong to region 0; otherwise, region 1. If the pixels belong to region 0, the flow advances to step S602, and the region 0 average value calculation unit 505 calculates the average value of the pixels. On the other hand, if the pixels belong to region 1, the flow advances to step S603, and the region 1 average value calculation unit 506 calculates the average value of the pixels.

In step S604, the subtraction unit 512 calculates a difference value between the average values of the two regions, and the comparison unit 513 compares that difference value with the threshold value Th2. If the calculated difference value is equal to or smaller than the threshold value Th2, the flow advances to step S608 to select the intra-window average value Aw as substitute data. That is, the selection unit 511 outputs the intra-window average value Aw as substitute data. On the other hand, if the calculated difference value is larger than the threshold value Th2, the flow advances to step S605. In step S605, the average value calculation unit 508 calculates an average value of the two region average values, and the comparison unit 509 compares that average value with an input pixel value Pi. Note that the sum of the two region average values is compared with a value obtained by doubling (shifting 1 bit to the left) input pixel data Pi in step S605 in place of comparison with the average value of the two region average values.

If the input pixel data Pi is smaller than the average value of the two region average values, the flow advances to step S606 to select a region 0 average value A0 as substitute data; otherwise, the flow advances to step S607 to select a region 1 average value A1 as substitute data. That is, it is determined to which of the region average values input pixel data is closer, and the selection unit 510 outputs the closer region average value as substitute data.

Figure 7:
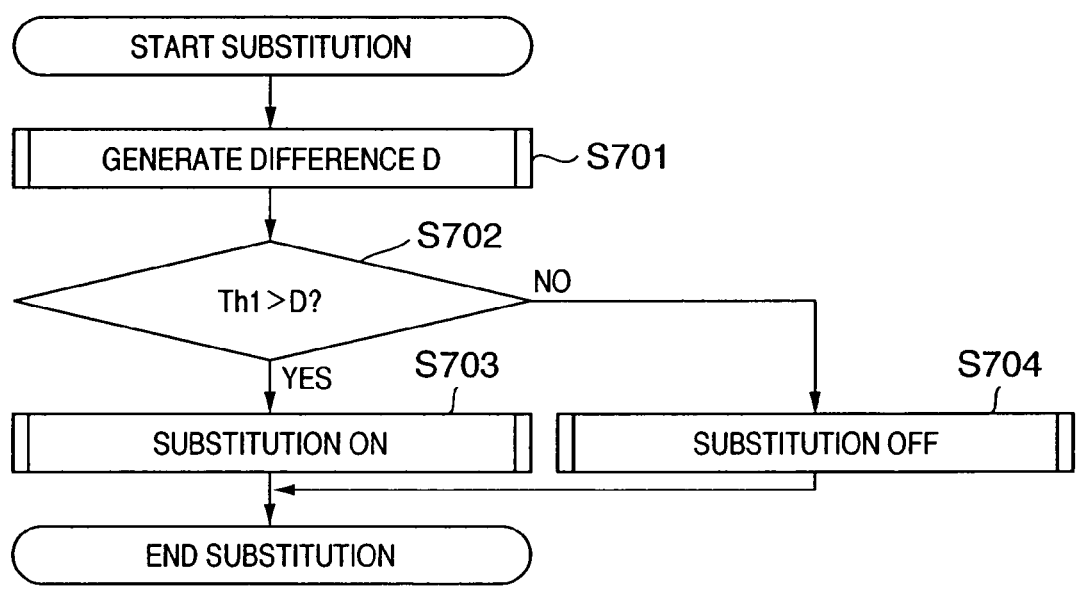
FIG. 7 is a flow chart showing a substitution process in the second embodiment.

FIG. 7 is a flow chart showing the substitution process in the second embodiment. In step S701, a difference value D between an input pixel value and substitute data as the output from the selection unit 511 is calculated. In step S702, the comparison unit 514 compares the difference value D with the threshold value Th1. If the difference value D is smaller than the threshold value Th1, the flow advances to step S703, and the pixel substitution unit 516 outputs the substitute data. If the difference value D is equal to or larger than the threshold value Th1, the flow advances to step S704 to output the input pixel value.

As described above, according to the second embodiment, in a window in which the difference between the average values of the two regions is small, an intra-window average value is selected as substitute data. Hence, a noise removal effect on a flat portion can be enhanced, and the process can be simple.

Third Embodiment

The third embodiment of the present invention will be described in detail hereinafter with reference to the accompanying drawings.

In the third embodiment, in the substitute data generation process explained in the second embodiment, the average value of two regions is output as substitute data in accordance with a random number generated by a random number generation unit.

Figure 8:
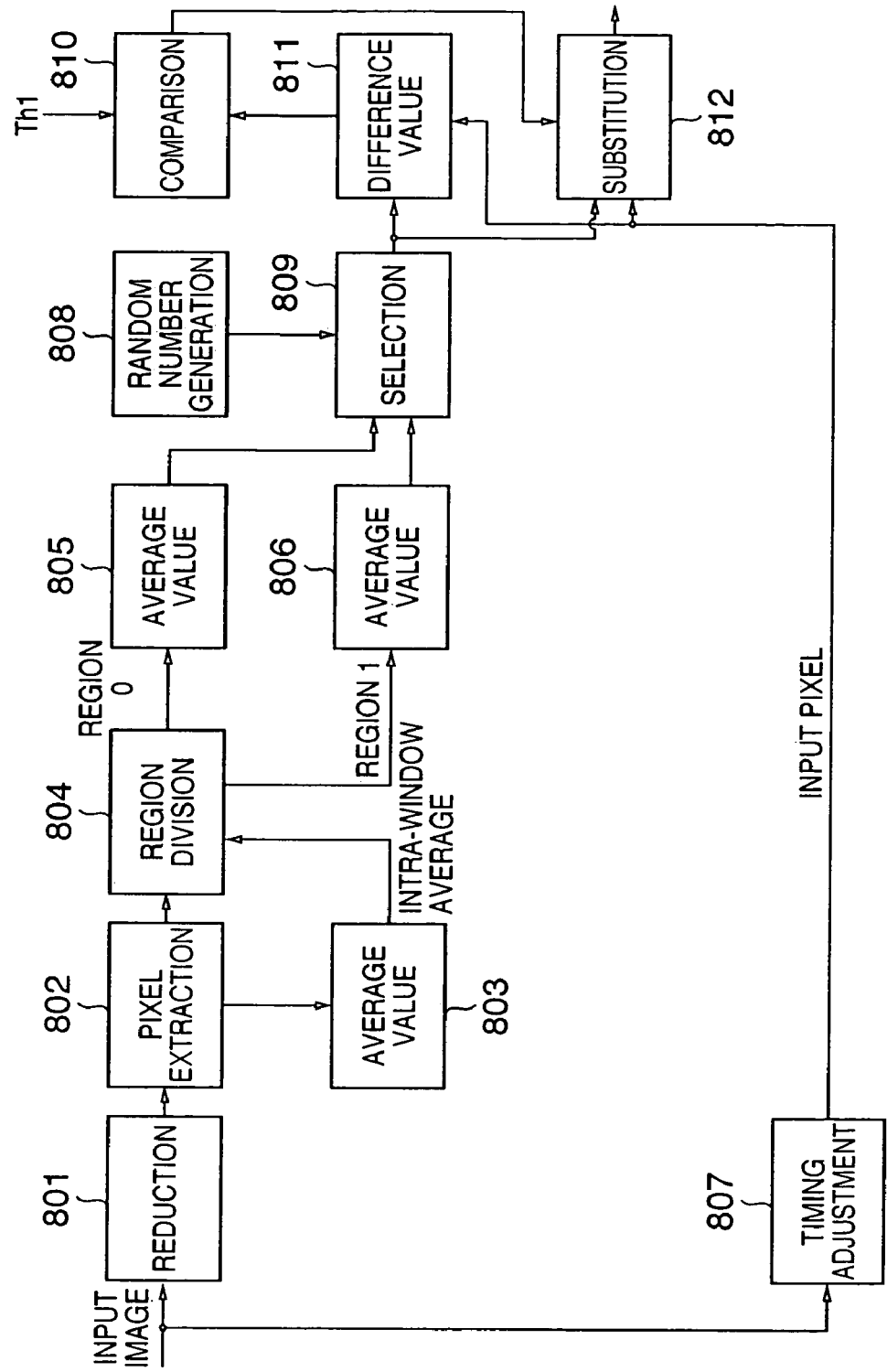
FIG. 8 is a block diagram showing the arrangement of an image processing apparatus according to the third embodiment.

FIG. 8 is a block diagram showing the arrangement of an image processing apparatus according to the third embodiment. Referring to FIG. 8, reference numerals 801 to 807 and 810 to 812 denote units which execute the same processes as those of the units 501 to 507 and 514 to 516 shown in FIG. 5 in the second embodiment, and a detailed description thereof will be omitted. Reference numeral 808 denotes a random number generation unit; and 809, a selection unit. Only differences from the second embodiment will be explained below.

The random number generation unit 808 generates a pseudo random number by a known method, and controls the selection unit 809 to randomly select the average value of region 0 or 1 as substitute data. The difference value generation unit 811 generates a difference absolute value Dt between an input pixel value Pi and the output (substitute data) from the selection unit 809. The comparison unit 810 compares this difference absolute value Dt with a threshold value Th1. Only when the difference absolute value Dt is smaller than the threshold value Th1, the pixel substitution unit 812 substitutes the input pixel value Pi by the output (substitute data) from the selection unit 809. Otherwise, the pixel substitution unit 812 outputs the input pixel value Pi intact.

The process of the image processing apparatus in the third embodiment will be described below. Note that the process of the third embodiment is substantially the same as that of the second embodiment, except for a substitute data generation process, and a description of the same process will be omitted.

Figure 9:
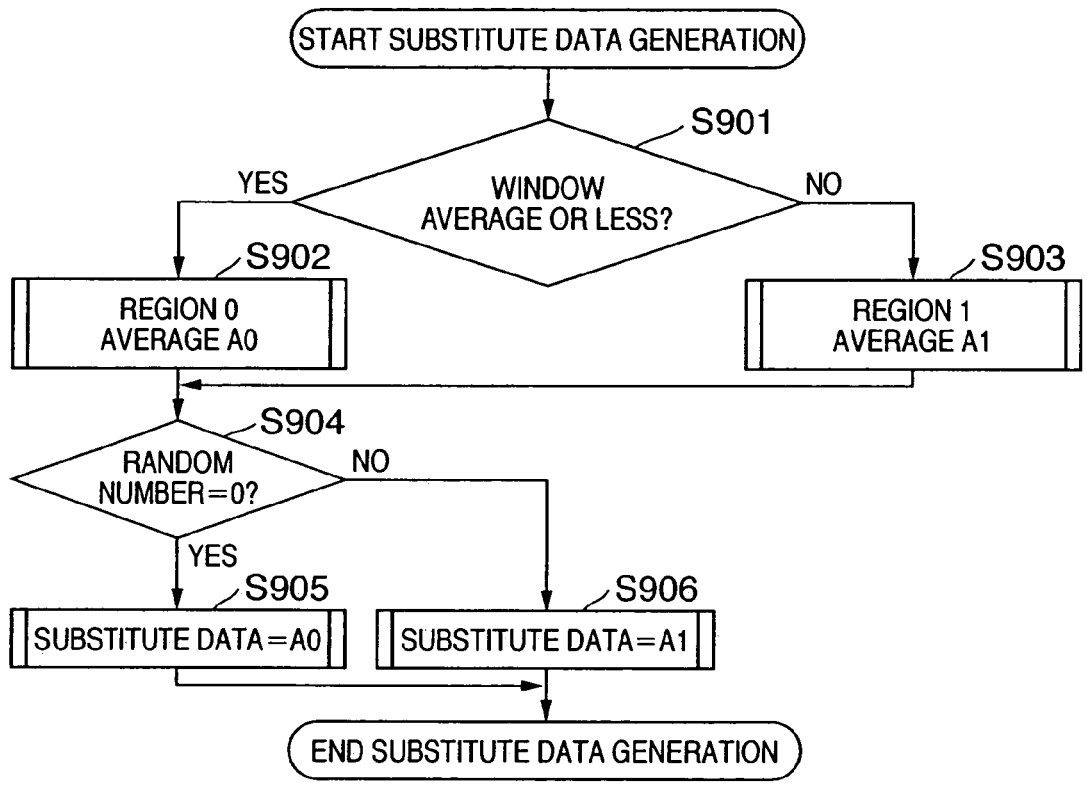
FIG. 9 is a flow chart showing a substitute data generation process in the third embodiment.

FIG. 9 is a flow chart showing a substitute data generation process in the third embodiment. The region determination unit 804 determines in step S901 if pixels in the window belong to region 0 or 1. More specifically, the intra-window average value calculation unit 503 calculates an average of the pixel values in the window, and the region determination unit 804 compares the pixel values in the window with the window average value. If the pixel values are equal to or smaller than the window average value, the region determination unit 804 determines that they belong to region 0; otherwise, region 1. If the pixels belong to region 0, the flow advances to step S902, and the region 0 average value calculation unit 505 calculates the average value of the pixels. On the other hand, if the pixels belong to region 1, the flow advances to step S903, and the region 1 average value calculation unit 506 calculates the average value of the pixels.

In step S904, the random number generation unit 808 generates a 1-bit random number. If the random number is zero, the flow advances to step S905, and the selection unit 809 outputs a region 0 average value A0 as substitute data. If the random number is not zero, the flow advances to step S906, and a region 1 average value A1 is output as substitute data.

As described above, according to the third embodiment, since the region 0 or 1 average value is randomly selected as substitute data, low-frequency noise is modulated to the high-frequency side by a random number, thus obtaining a noise removal effect due to the MTF of a display system or visual sense. Also, the process is further simplified. Since the frequency characteristics of a random number shift to the high-frequency range side by limiting the 0 or 1 runlength of the aforementioned random number output, a more effective noise removal effect can be obtained.

Fourth Embodiment

The fourth embodiment of the present invention will be described in detail hereinafter with reference to the accompanying drawings.

In the fourth embodiment, a pixel in a window is randomly selected in accordance with a random number generated by a random number generation unit, and is output as substitute data.

Figure 10:
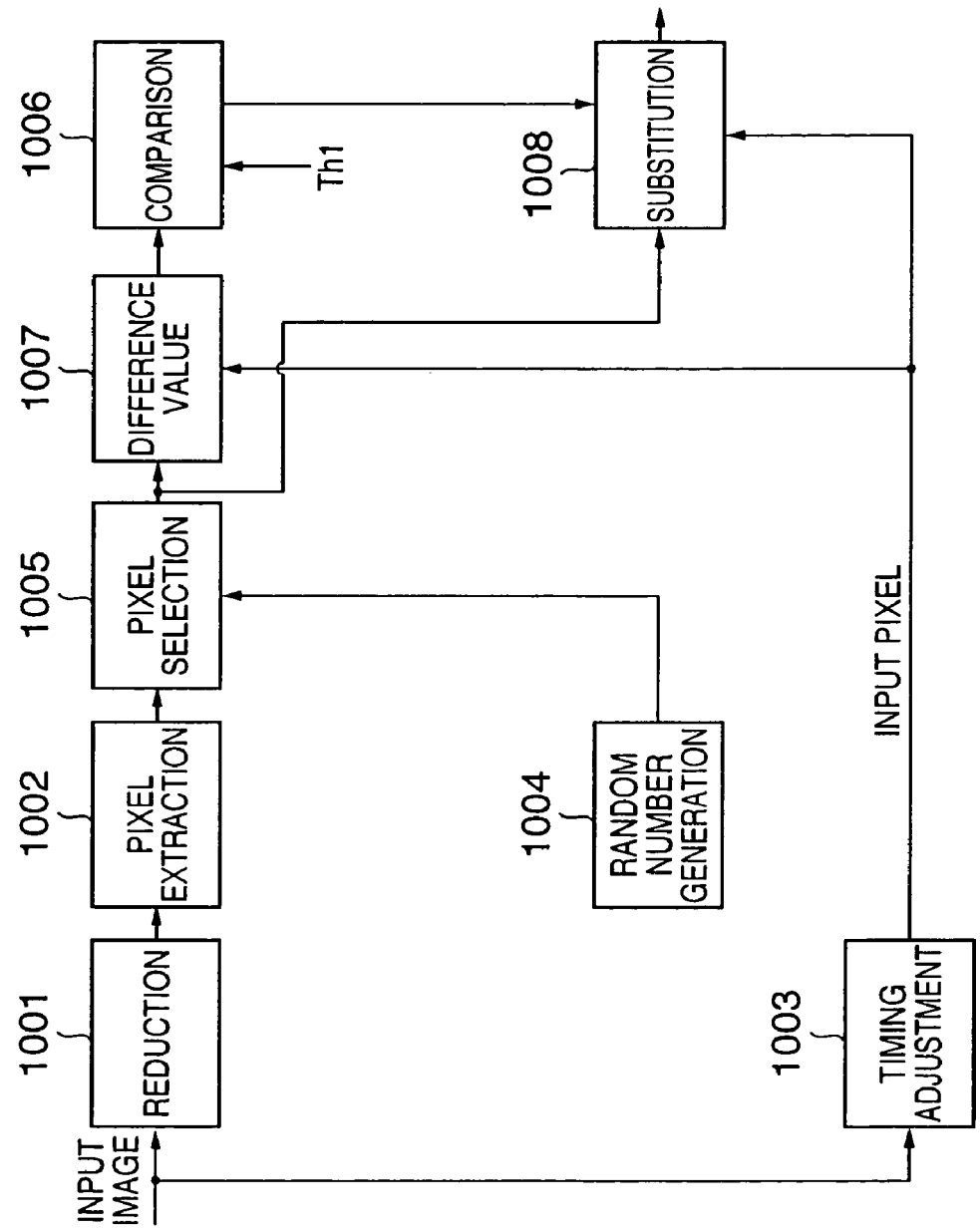
FIG. 10 is a block diagram showing the arrangement of an image processing apparatus according to the fourth embodiment.

FIG. 10 is a block diagram showing the arrangement of an image processing apparatus according to the fourth embodiment. Referring to FIG. 10, reference numerals 1001, 1002, and 1003 denote the same units as the image reduction unit, pixel extraction unit, and timing adjustment unit in the first to third embodiments; 1006 to 1008, the same units as the comparison unit, difference value generation unit, and pixel substitution unit in the second and third embodiments. Hence, a description of these units will be omitted. Reference numeral 1004 denotes a random number generation unit; and 1005, a pixel selection unit. Only differences from the aforementioned embodiments will be described below.

As in the third embodiment, the random number generation unit 1004 generates a pseudo random number by a known method, and controls the pixel selection unit 1005 to randomly select a pixel in the window as substitute data. As in the second and third embodiments, the difference value generation unit 1007 generates a difference absolute value Dt between an input pixel value Pi and the output (substitute data) from the pixel selection unit 1005. The comparison unit 1006 compares this difference absolute value Dt with a threshold value Th1. Only when the difference absolute value Dt is smaller than the threshold value Th1, the pixel substitution unit 1008 substitutes the input pixel value Pi by the output (substitute data) from the pixel selection unit 1005. Otherwise, the pixel substitution unit 1008 outputs the input pixel value Pi intact.

If the window size in the fourth embodiment is 4×4, since the number of pixels in the window is 16, a random number is expressed by 4 bits.

Figure 11:
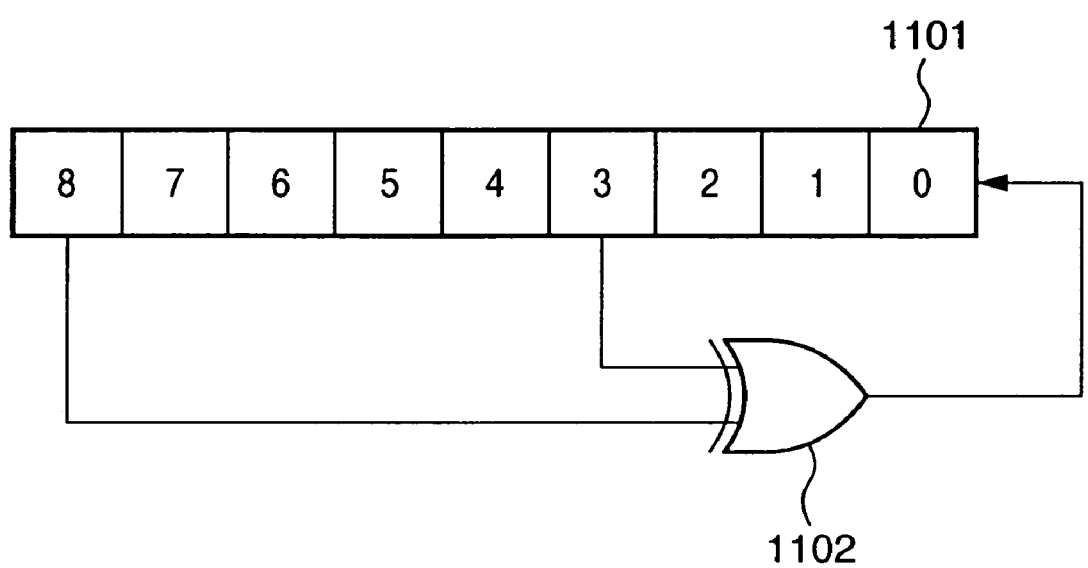
FIG. 11 is a diagram showing an example of the arrangement of a 9-bit M-sequence pseudo random code generation circuit.

FIG. 11 shows an example of the arrangement of a 9-bit M-sequence pseudo random code generation circuit. Referring to FIG. 11, reference numeral 1101 denotes a shift register; and 1102, an EXOR circuit. In this M-sequence pseudo random code generation circuit, a value other than zero is loaded in advance to the shift register 1101, and the EXOR of bits corresponding to a primitive polynomial of the shift register is input to bit 0 to shift the bits to the left, thus obtaining the next random number. In the fourth embodiment, since the shift register 1101 has nine stages, a primitive polynomial of degree 9, X9+X4+1, is used. Hence, the EXOR of bits 8 and 3 of the shift register 1101 by the EXOR circuit 1102 is input to bit 0, and bits are shifted to the left in response to the next clock. With this arrangement, a random number ranging from 1 to 511 is generated at a period of 511.

Since the range of the random number generation unit 1004 is 0 to 15, a random number from 0 to 15 at 511 periods can be obtained using arbitrary 4 bits of the shift register 1101. The random number generation means is not limited to such specific methods, and a pseudo random number may be generated by a known method.

Also, the horizontal and vertical positions in the window may be generated by pseudo random numbers to determine a pixel to be selected as substitute data.

The generation probability of a pseudo random number may form a uniform probability distribution or a probability distribution depending on the distance from a pixel corresponding to an input pixel in the window. For example, in order to improve a low-frequency noise removal effect by substitution, a relatively high generation probability may be given to a pixel located at a position away from a pixel corresponding to an input pixel.

When substitution is not made as a result of comparison with the threshold value, another new substitute data may be generated from the window of interest until substitution is made or a predetermined number of times is reached, and may be compared with the threshold value, thus increasing the substitution probability.

As described above, according to the fourth embodiment, since a pixel in the window is randomly selected as substitute data, low-frequency noise is modulated to the high-frequency side by the generated random number although a simple arrangement is adopted, thus obtaining a high noise removal effect due to the MTF of a display system or visual sense. Since the random number output is inverted or non-inverted as an input pixel is updated, the frequency characteristics of a random number shift to the high-frequency range side, and a higher noise removal effect can be obtained.

Fifth Embodiment

The fifth embodiment of the present invention will be described in detail hereinafter with reference to the accompanying drawings.

In the fifth embodiment, an input image is categorized into a plurality of categories, and substitute data according to the categories are generated.

Figure 12:
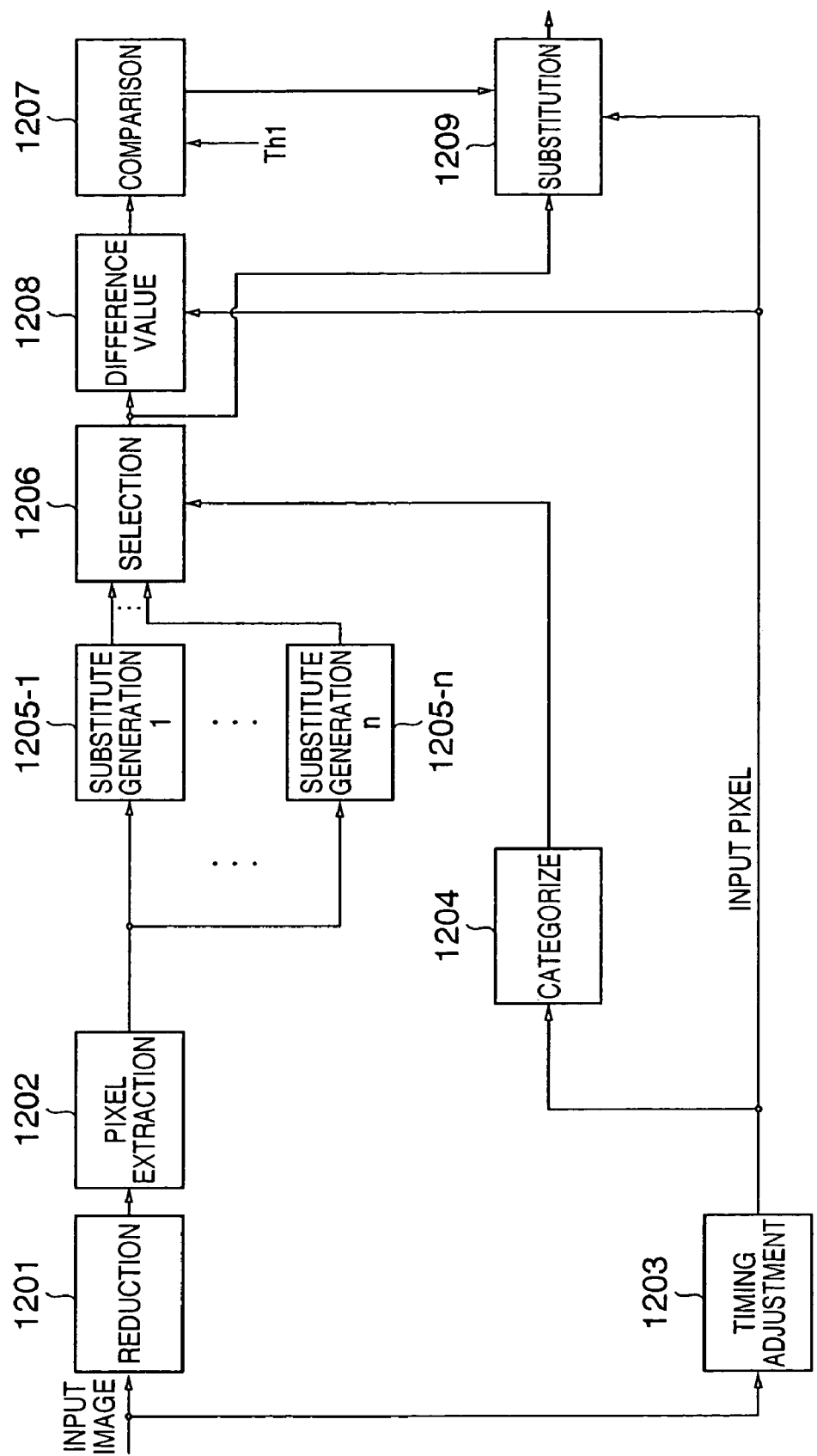
FIG. 12 is a block diagram showing the arrangement of an image processing apparatus according to the fifth embodiment.

FIG. 12 is a block diagram showing the arrangement of an image processing apparatus according to the fifth embodiment. Referring to FIG. 12, reference numerals 1201 to 1203 and 1207 to 1209 denote units which execute the same processes as those of the units 1001 to 1003 and 1006 to 1008 shown in FIG. 10 in the fourth embodiment, and a description thereof will be omitted. Reference numeral 1204 denotes a categorize unit; 1205, substitute data generation units; and 1206, a substitute data selection unit. Only differences from the fourth embodiment will be explained below.

The categorize unit 1204 categorizes an input image to a plurality of categories. The substitute data generation units 1205 generate substitute data for noise removal using a plurality of algorithms or a plurality of different threshold values, which have been explained in the first to fourth embodiments. The substitute data selection unit 1206 selects substitute data suited to a given category in accordance with the category. After that, the same determination process as in the fourth embodiment is executed, and an input pixel is substituted to remove noise.

Note that categories are defined with reference to, e.g., a portion that may produce an adverse effect if it undergoes a substitution process, a portion where low-frequency noise is conspicuous, a portion where high-frequency noise is conspicuous, a portion where both low-frequency noise and high-frequency noise are conspicuous, and the like. Especially, in the first to fourth embodiments, adverse effects appear in different ways, and these embodiments have different compatibilities to different input images.

For example, the fourth embodiment is suitable for a portion having fine texture like cloth since good appearance can be maintained without any average process. The second embodiment is suitable for a dark portion since appearance can be improved by the average process. Furthermore, noise appears in different ways depending on the gamut of an input pixel. Also, a level difference which is recognized as a flat portion differs. Hence, an optimal value of the threshold value Th2 in the second embodiment varies.

As described above, according to the fifth embodiment, substitute data are generated using a plurality of algorithms (including threshold value control), and substitute data suited to a category is selected to substitute an input pixel. Hence, a high noise removal effect can be obtained while minimizing adverse effects.

Sixth Embodiment

The sixth embodiment of the present invention will be described in detail hereinafter with reference to the accompanying drawings.

In the sixth embodiment, a threshold value selection unit for selecting one of a plurality of threshold values in accordance with a category is added to the fifth embodiment.

Figure 13:
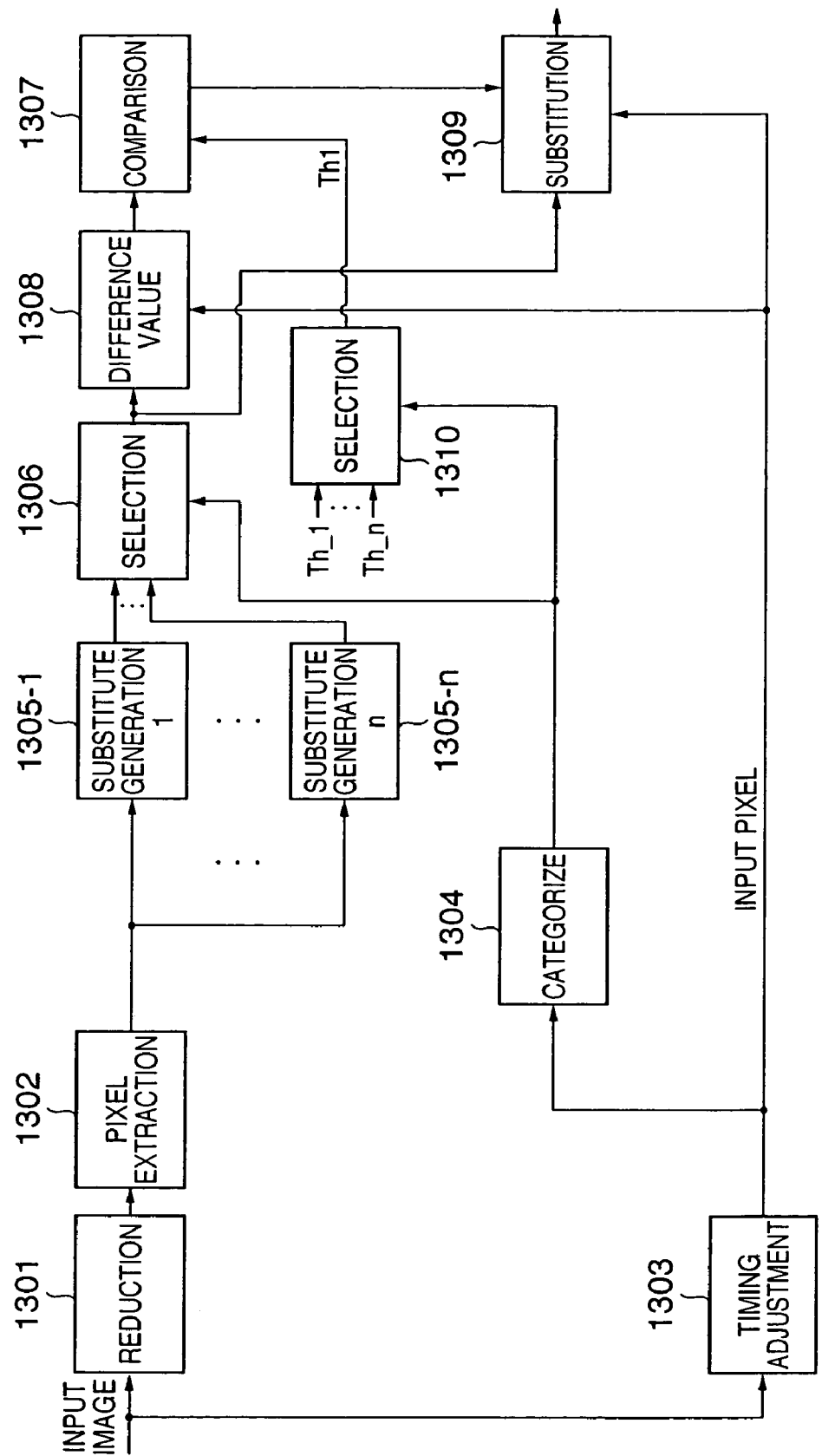
FIG. 13 is a block diagram showing the arrangement of an image processing apparatus according to the sixth embodiment.

FIG. 13 is a block diagram showing the arrangement of an image processing apparatus according to the sixth embodiment. Referring to FIG. 13, reference numerals 1301 to 1309 denote units which execute the same processes as those in FIG. 12 in the fifth embodiment, and a description thereof will be omitted. Reference numeral 1310 denotes a threshold value selection unit. Only differences from the fifth embodiment will be described below.

The categorize unit 1304 categorizes an input image to a plurality of categories. The threshold value selection unit 1310 selects a threshold value Th1 suited to the selected category in accordance with the selected category. After that, the same determination process as in the fifth embodiment is executed, and an input pixel is substituted to remove noise.

Note that categories are defined with reference to the ways adverse effects appear upon executing a substitution process. That is, a large threshold value is selected for a portion where adverse effects are inconspicuous so as to enhance the noise removal effect, and a small threshold value is selected for a portion where adverse effects are conspicuous so as to obscure adverse effects.

Furthermore, when an input gain is varied by AGC (Auto Gain Control) or the like, since the noise amplitude is also varied, it is desirable to also change the threshold value Th1 in correspondence with the input gain.

In the sixth embodiment, a plurality of substitute data generation units and threshold values have been explained in correspondence with each other. However, the present invention is not limited to such specific arrangement, and the number of substitute data generation units may be different from that of threshold values. For example, one substitute data generation unit may generate substitute data. In this case, the substitute data selection unit 1306 is omitted.

As described above, according to the sixth embodiment, since a threshold value is selected according to the category upon substituting an input pixel, a high noise removal effect can be obtained while minimizing adverse effects.

As described above, according to the first to sixth embodiments, noise and a significant signal are separated by comparing an average value and input pixel value, and a noise removal effect is effective to lower frequency components by generating substitute data from the reduced image. Also, the number of substitute pixels near an edge is increased using a region-dependent average value, the effective range of the noise removal effect can be broadened, and a higher noise removal effect can be obtained by a simple operation without any adverse effects. Especially, the capacity of a line memory required for the process can be greatly reduced.

In a window in which the difference between two region averages is small, an intra-window average value is selected as substitute data, thus enhancing a noise removal effect on a flat portion, and simplifying the process.

A region 0 or 1 average value is randomly selected as substitute data, thus modulating low-frequency noise to the high-frequency side by a random number, and obtaining a noise removal effect due to the MTF of a display system or visual sense. Also, the process is further simplified.

After high-frequency noise is removed by reduced image generation, a pixel in a window of the reduced image is randomly selected as substitute data, thus obtaining a high noise removal effect without impairing details.

Substitute data are generated by a plurality of algorithms including threshold value control, and substitute data is selected in correspondence with a category to substitute a input pixel, thus obtaining a high noise removal effect which matches image characteristics while minimizing adverse effects.

A threshold value is selected in correspondence with a category to substitute a input pixel, thus obtaining a high noise removal effect which matches image characteristics while minimizing adverse effects.

Seventh Embodiment

In the first to sixth embodiments, an input image is reduced to a predetermined reduction scale (e.g., ¼) to reduce the number of pixels (window size) for low-frequency noise removal. However, in the seventh embodiment, an input image is downsized to a predetermined scale by an image downsize unit.

Figure 14:
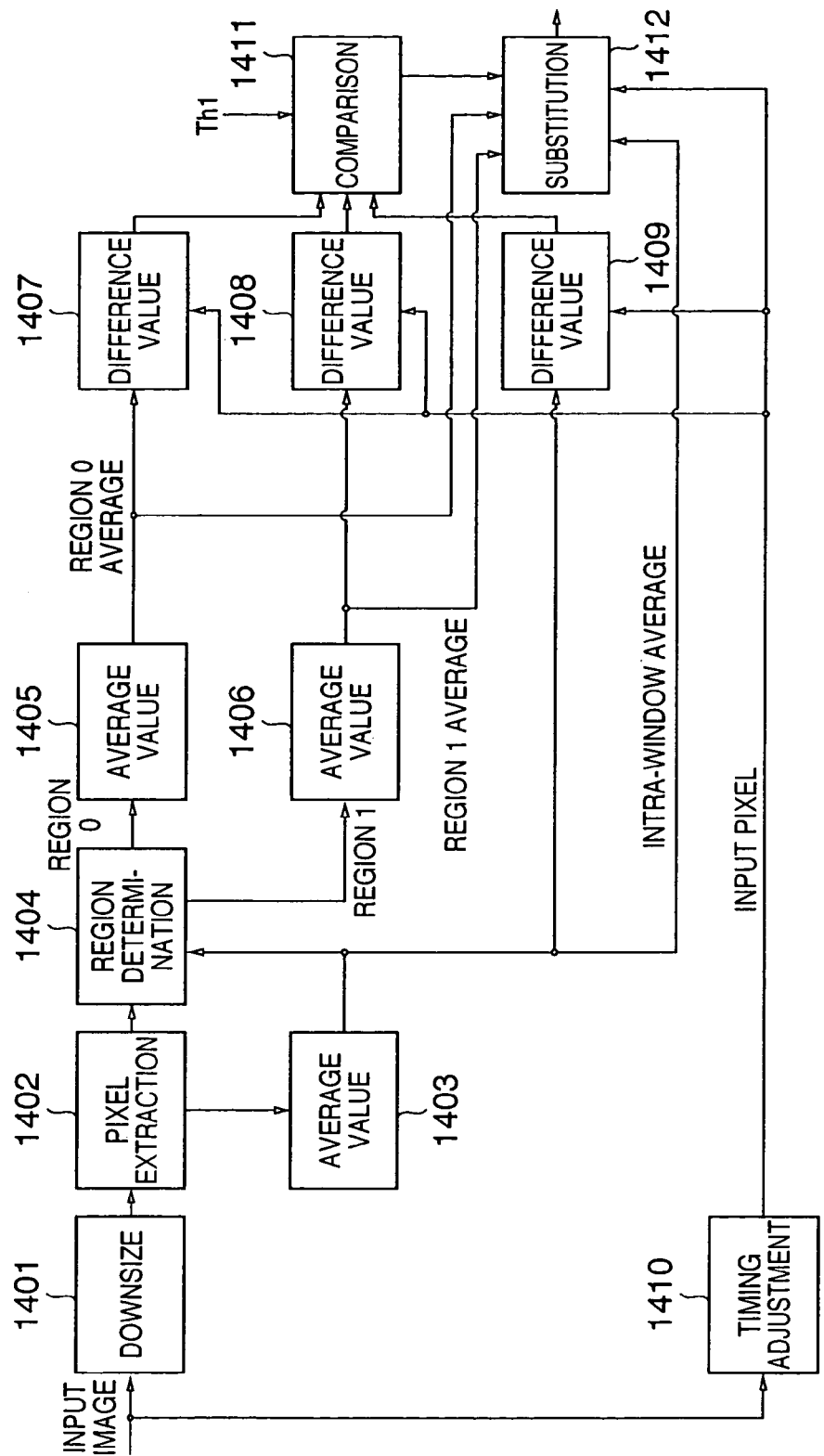
FIG. 14 is a block diagram showing the arrangement of an image processing apparatus according to the seventh embodiment.

FIG. 14 is a block diagram showing the arrangement of an image processing apparatus according to the seventh embodiment. Referring to FIG. 14, reference numeral 1401 denotes an image downsize unit, which downsizes an input image to a predetermined scale (e.g., ¼). Reference numeral 1402 denotes a pixel extraction unit, which extracts pixels to an n×m (m and n are integers) rectangular pattern (window) having an input pixel position as the center from the reduced image. Reference numeral 1403 denotes an intra-window average value calculation unit, which generates an average value of the extracted pixel values in the window. Reference numeral 1404 denotes a region determination unit which compares, e.g., downsize pixel values in the window with the intra-window average value, and determines that pixels whose pixel values are equal to or smaller than the intra-window average value belong to region 0, or determines that other pixels belong to region 1. Reference numeral 1405 denotes a region 0 average value calculation unit, which generates an intra-window average value of pixels which are determined as those in region 0 by the region determination unit 1404. Reference numeral 1406 denotes a region 1 average value calculation unit, which generates an intra-window average value of pixels which are determined as those in region 1 by the region determination unit 1404.

Reference numeral 1410 denotes a timing adjustment unit which delays an input image (pixel of interest) by a time corresponding to latency in respective processing units. Reference numeral 1407 denotes a region 0 difference value generation unit, which generates a difference absolute value between the output from the region 0 average value calculation unit 1405 and the input image (pixel of interest) which is delay-compensated by the timing adjustment unit 1410. Reference numeral 1408 denotes a region 1 difference value generation unit, which generates a difference absolute value between the output from the region 1 average value calculation unit 1406 and the input image (pixel of interest) which is delay-compensated by the timing adjustment unit 1410. Reference numeral 1409 denotes an intra-window difference value generation unit, which generates a difference absolute value between the output from the intra-window average value calculation unit 1403 and the input image (pixel of interest) which is delay-compensated by the timing adjustment unit 1410. Reference numeral 1411 denotes a comparison unit which controls a pixel substitution unit 1412 to select a smallest average value, which is smaller than or equal to or smaller than a threshold value Th1, from the difference absolute values output from the three difference value generation units 1407, 1408, and 1409. If none of difference absolute values are smaller than or equal to or smaller than the threshold value Th1, the comparison unit 1411 controls the pixel substitution unit 1412 to select the input image (pixel of interest). The pixel substitution unit 1412 substitutes an input pixel value by the average value that meets the above condition only when the minimum difference absolute value smaller than or equal to or smaller than the threshold value Th1 is present.

A schematic arrangement and process of the aforementioned image downsize unit 1401 will be described below.

Figure 15:
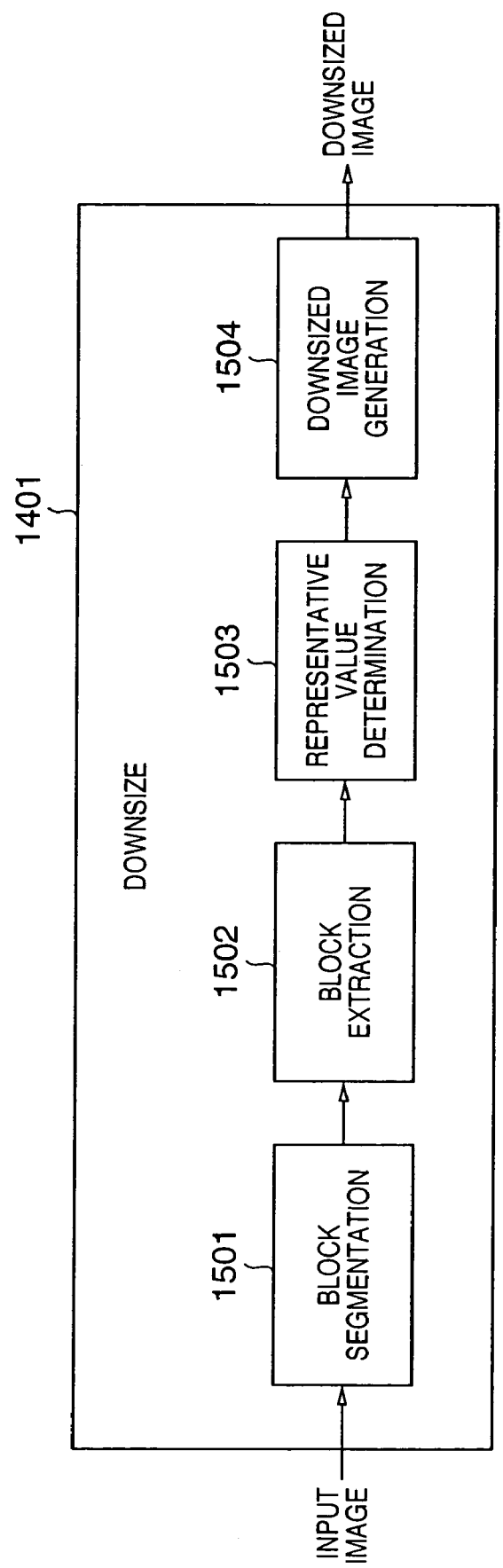
FIG. 15 is a block diagram showing the arrangement of an image downsize unit 1401 in the seventh embodiment.

FIG. 15 is a block diagram showing the arrangement of the image downsize unit 1401 in the seventh embodiment. Referring to FIG. 15, reference numeral 1501 denotes a block segmentation unit for segmenting input image data into blocks in accordance with a downsize scale. If a downsize scale is 1/A, an A×A block size is set. Various methods of segmenting input image data into blocks with a set block size are available, as will be described later. In this case, blocks need only be set so that respective pixels of an input image are assigned to any of blocks.

Figure 16A:
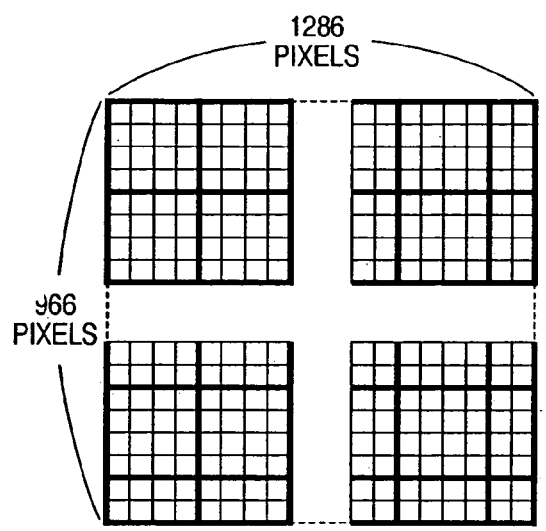
FIGS. 16A to 16D are views for explaining block segmentation.

FIGS. 16A to 16D are views for explaining block segmentation. FIG. 16A is a view for explaining a method of applying blocks with a small block size to at least some end regions of an input image. Upon downsizing an original image of 1286× 966 pixels to ¼, the original image is segmented into blocks by setting a 2×4 block size for the right end region, a 4×2 block size for the lower end region, a 2×2 block size for the lower right corner region, and a 4×4 block size for other regions.

Figure 16B:
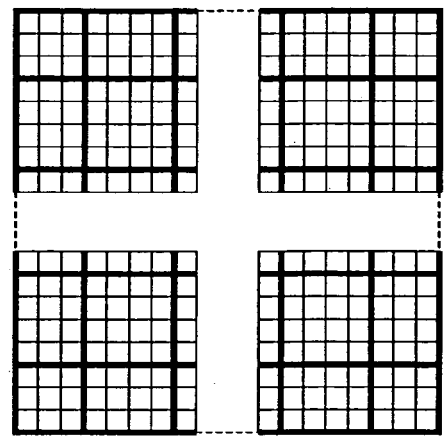

FIG. 16B is a view for explaining a method of applying blocks with a small block size to all end regions of an input image. Upon downsizing an original image of 1286×966 pixels to ¼, the original image is segmented into blocks by setting a 3×3 block size for the four corner regions of the original image, a 4×3 block size for the upper and lower end regions, a 3×4 block size for the right and left end regions, and a 4×4 block size for other regions.

Figure 16C:
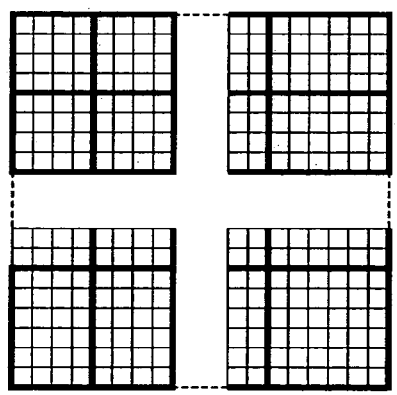

FIG. 16C is a view for explaining a method of applying blocks with a large block size to at least some end regions of an input image. Upon downsizing an original image of 1286× 966 pixels to ¼, the original image is segmented into blocks by setting a 6×4 block size for the right end region, a 4×6 block size for the lower end region, a 6×6 block size for the lower right corner region, and a 4×4 block size for other regions.

Figure 16D:
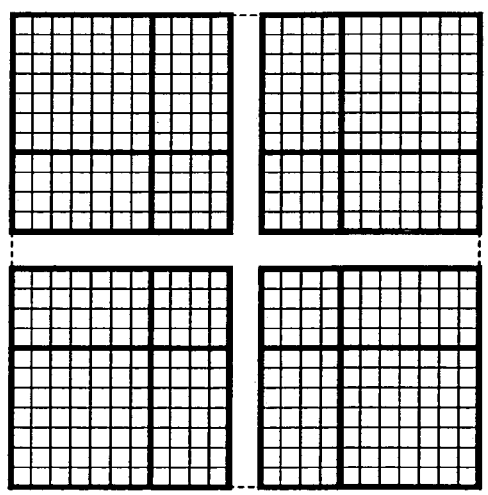

FIG. 16D is a view for explaining a method of applying blocks with a large block size to all end regions of an input image. Upon downsizing an original image of 1286×966 pixels to ¼, the original image is segmented into blocks by setting a 7×7 block size for the four corner regions of the original image, a 4×7 block size for the upper and lower end regions, a 7×4 block size for the right and left end regions, and a 4×4 block size for other regions.

When the numbers of horizontal and vertical pixels of an input mage are integer multiples of those of a block size in block segmentation, blocks with an identical size may be applied to all the regions of the input image.

Referring back to FIG. 15, reference numeral 1502 denotes a block extraction unit, which extracts a block corresponding to the position of an input pixel from those segmented by the block segmentation unit 1501. Note that the corresponding block is the one which includes an input pixel of interest (pixel of interest). More specifically, a block including a pixel of interest is extracted, and is set as a block of interest.

Reference numeral 1503 denotes a representative value determination unit, which determines a representative value from pixels in the block of interest. Various method of determining a representative value are available, but the present invention is not limited to methods to be described below and any other methods may be used as long as a representative value can be determined based on pixels in the block of interest. As a method of determining a representative value, a method of determining a representative value using a random number obtained by random number generation means is known. For example, the horizontal and vertical positions of a pixel in the block of interest are determined using random numbers. The value of the pixel at the determined horizontal and vertical positions is used as a representative value. If the window size is 4×4, the number of pixels in both the horizontal and vertical directions of the window is 4, and a random number is expressed by 2 bits. Alternatively, pixels in the block of interest are numbered in turn, and the value of a pixel with a number corresponding to a generated random number is selected as a representative value. If the window size is 4×4, since the number of pixels in the window is 16, a random number is expressed by 4 bits. The aforementioned random number generation means generates a pseudo random number by a known method.

As another method of determining a representative value, means for determining a mode value as a representative value is known. Note that the mode value is a value which has the highest frequency of occurrence of pixel values in the block of interest, and that value is used as a representative value of the block of interest. If there are a plurality of mode values, one of the plurality of mode values is randomly selected using a random number as a representative value. Alternatively, a mode value closest to a median (to be described later) in the block of interest is selected as a representative value. The method of selecting one of a plurality of mode values as a representative value is not limited to the aforementioned methods, and a mode value may be randomly selected from the block of interest or may be determined in consideration of the distribution of pixel values in the block of interest.

As still another method of determining a representative value, means for determining a median as a representative value is known. The value of a pixel which is located at the center upon arranging pixels in the window in descending order of pixel value, or the median of a pixel range in the window is determined as a representative value.

Reference numeral 1504 denotes a downsized image generation unit, which generates downsized image data having the representative value in the block of interest as pixel values. The representative value in the block of interest is preserved as a pixel value, and a downsized image is generated by downsizing data from the input image.

The process for segmenting an input image into blocks, and substituting a pixel of interest in a block of interest on the basis of a predetermined condition in the image processing apparatus with the above arrangement will be described below.

Figure 17:
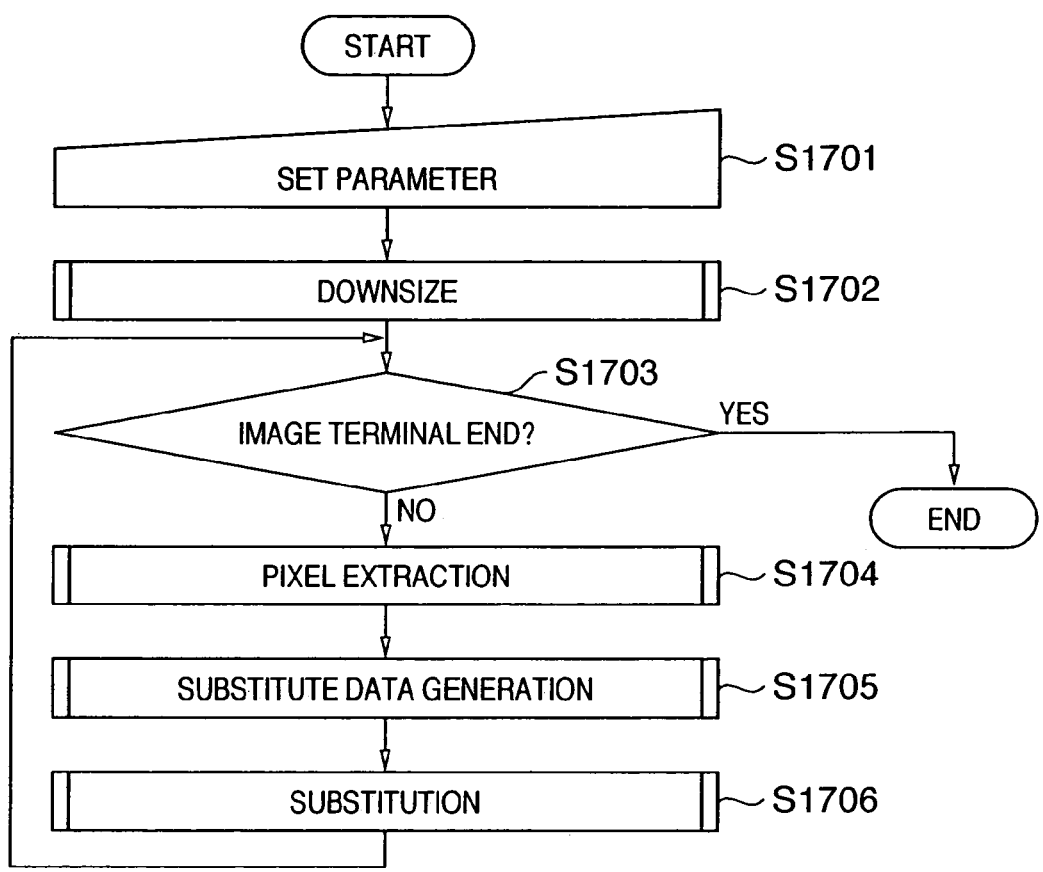
FIG. 17 is a flow chart showing the process of the image processing apparatus according to the seventh embodiment.

FIG. 17 is a flow chart showing the process of the image processing apparatus of the seventh embodiment. In step S1701, a CPU (not shown) sets parameters required for respective processes. Note that parameters to be set include an image downsize scale, block size, window size, and threshold value, which are determined in correspondence with an input image and nature of noise to be removed. The parameters may be determined by analyzing an input image, or values which are determined in advance based on the property or output condition of an input image may be set. When constant values are always set as the parameters, this parameter setting step is skipped.

In step S1702, the image downsize unit 1401 reduces an input image to a predetermined downsize scale. This downsize sequence is as described above. With this downsize process, the number of pixels (window size) for low-frequency noise removal (to be described later) is decreased. When a smaller downsize scale is set (to set a smaller output size), the window size in the subsequent process can be decreased. However, since the degree of influence near an input pixel decreases, not only a difference from the input pixel becomes large, and the number of pixels to be substituted decreases, but also jaggy-like disturbance due to ON/OFF of substitution appears at an edge portion. On the other hand, when a larger downsize scale is set (to set a larger output size), since the window size in the subsequent process increases, the processing amount increases. Hence, in the description of the seventh embodiment, the downsize scale is set to be ¼ as one of preferred examples.

Upon completion of the image downsize process, the flow advances to step S1703 to check if the image has been processed up to its terminal end. If YES in step S1703, the process ends; otherwise, the flow advances to step S1704, and the pixel extraction unit 1402 extracts downsized pixel data in a predetermined pattern (window) having a downsized pixel corresponding to the position of the input pixel (pixel of interest) as the center. This window shifts upon movement of the position of an input pixel (pixel of interest). Since the downsize scale is ¼, as described above, if a downsized pixel is generated from 4×4 blocks, the window shifts one pixel in the horizontal direction when an input pixel moves four pixels in the horizontal direction. Also, when an input pixel moves four lines in the vertical direction, the window shifts one line in the vertical direction. That is, when an input pixel moves and a downsized pixel corresponding to the input pixel shifts one pixel, the window also shifts one pixel.

If the window size=4×4 and the downsize scale=¼, this window corresponds to a 16×16 window on an original input image, and is effective to eliminate speckle noise to a maximum of an 8×8 size. In the following description, the window size is 4×4.

In step S1705, substitute data is generated from the downsized pixels in the extracted window. Note that this process is done by the intra-window average value calculation unit 1403, region determination unit 1404, region 0 average value calculation unit 1405, region 1 average value calculation unit 1406, region 0 difference value generation unit 1407, region 1 difference value generation unit 1408, intra-window difference value generation unit 1409, and comparison unit 1411, as will be described in detail below.

Figure 18:
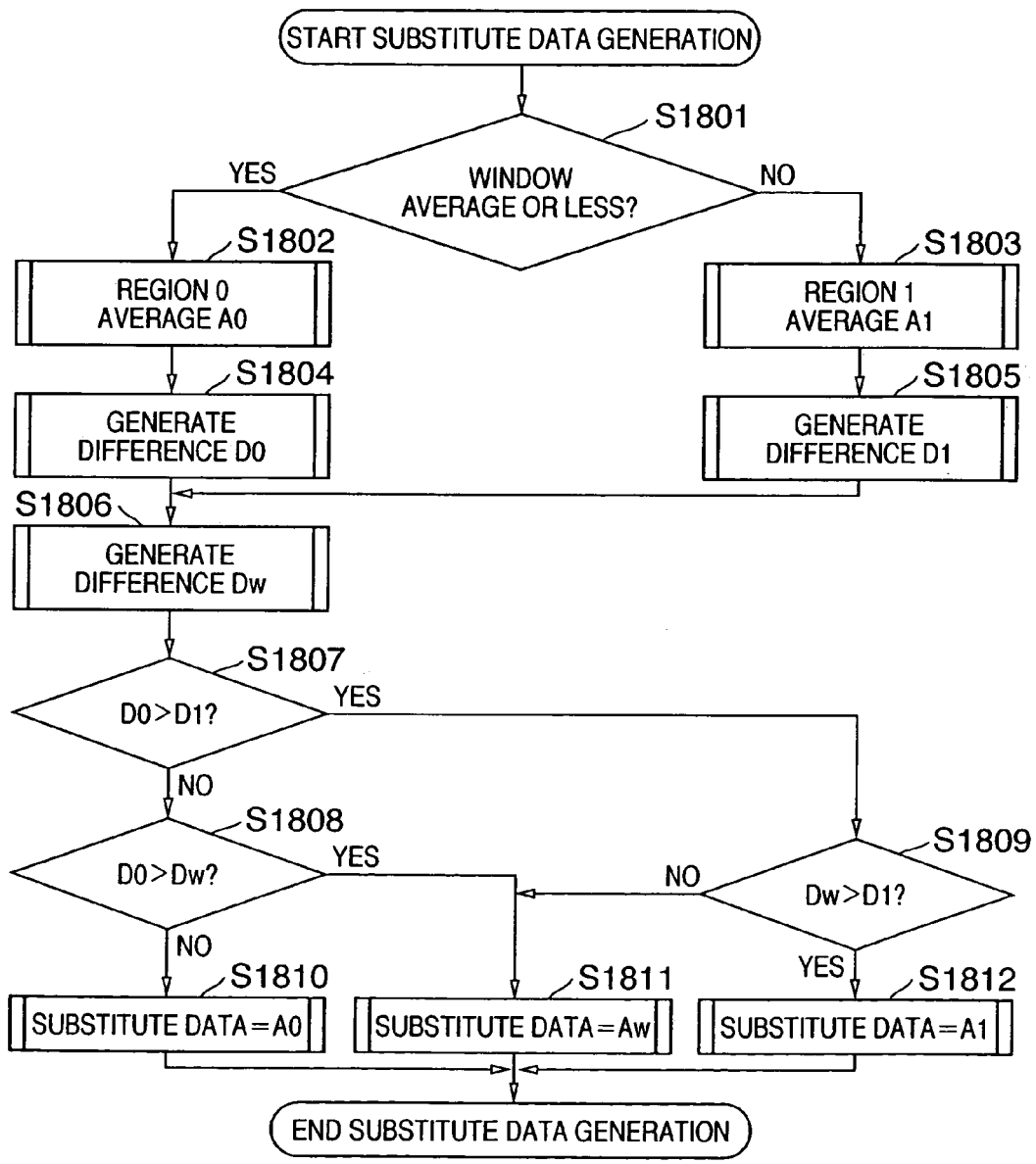
FIG. 18 is a flow chart showing a substitute data generation process in the seventh embodiment.

FIG. 18 is a flow chart showing a substitute data generation process in the seventh embodiment. The region determination unit 1404 determines in step S1801 if pixels in the window belong to region 0 or 1. More specifically, the intra-window average value calculation unit 1403 calculates an average of the pixel values in the window, and the region determination unit 1404 compares the pixel values in the window with the window average value. If the pixel values are smaller than or equal to or smaller than the window average value, the region determination unit 1404 determines that they belong to region 0; otherwise, region 1. If the pixels belong to region 0, the flow advances to step S1802, and the region 0 average value calculation unit 1405 calculates the average value of the pixels. On the other hand, if the pixels belong to region 1, the flow advances to step S1803, and the region 1 average value calculation unit 1406 calculates the average value of the pixels. In step S1804 or S1805, the region 0 difference value generation unit 1407 or region 1 difference value generation unit 1408 calculates a difference absolute value D0 or D1 between the average value of each region and an input pixel value.

In step S1806, the intra-window difference value generation unit 1409 calculates a difference absolute value Dw between the above window average value and the input pixel value. In steps S1807 to S1809, the comparison unit 1411 compares the difference absolute values D0 and D1 between the average values of the respective regions and the input pixel value, and the difference absolute value Dw between the window average value and input pixel value in turn. As a result, an average value as a smallest difference absolute value (smallest difference absolute value D) is determined as substitute data (steps S1810 to S1812).

That is, if the difference absolute value D0 of region 0 is smallest, an average value A0 calculated by the region 0 average value calculation unit 1405 is determined as substitute data. Likewise, if the difference absolute value D1 of region 1 is smallest, an average value A1 calculated by the region 1 average value calculation unit 1406 is determined as substitute data. Furthermore, if the intra-window difference value Dw is smallest, an average value Aw calculated by the intra-window average value calculation unit 1403 is determined as substitute data.

Referring back to FIG. 17, in step S1706 if a predetermined condition is satisfied for the aforementioned smallest difference absolute value D, the comparison unit 1411 and pixel substitution unit 1412 substitute the input pixel value by the generated substitute data, and output the substituted data; otherwise, they directly output the input pixel value. After the above process is repeated to the terminal end of the input image (YES in step S1703), this process ends.

Figure 19:
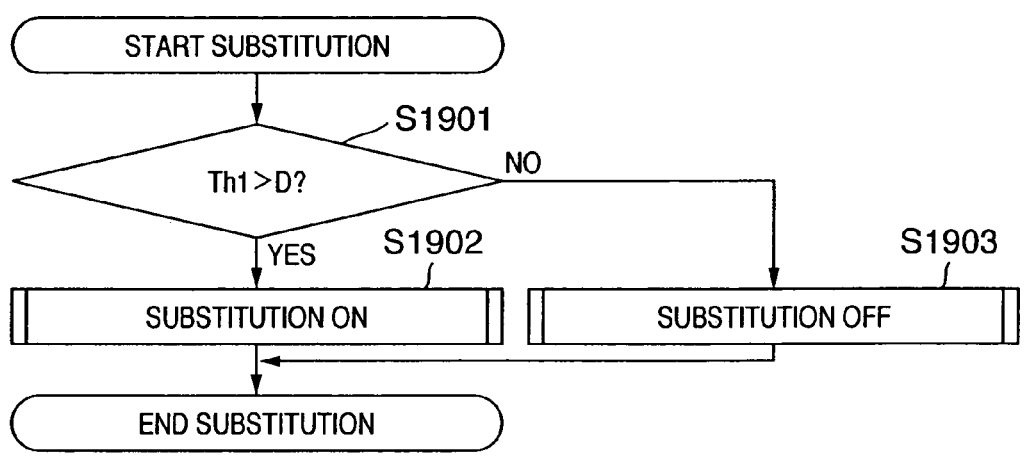
FIG. 19 is a flow chart showing a substitution process in the seventh embodiment.

FIG. 19 is a flow chart showing the substitution process in the seventh embodiment. In step S1901, the comparison unit 1411 compares the smallest difference absolute value D with a threshold value Th1. If the smallest difference absolute value D is smaller than or equal to or smaller than the threshold value Th1, the flow advances to step S1902, and the pixel substitution unit 1412 outputs substitute data. On the other hand, if the smallest difference absolute value D is equal to or larger than the threshold value Th1, the flow advances to step S1903, and the input pixel value is output.

With the series of processes mentioned above, the average value corresponding to the smallest difference absolute value which is smaller than or equal to or smaller than the threshold value Th1 of the calculated difference absolute values is selected as substitute data to substitute an input pixel, thus removing noise.

As described above, upon eliminating speckle noise to a maximum of an 8×8 size, if a downsized image is not used, a 16×16 window is required. In this case, if W represents the number of pixels in the horizontal direction, the required line memory size is 15W. However, since the seventh embodiment uses a ¼ downsized image, the required line memory size is 3 lines×(¼)W=(¾)W, and is reduced to 1/20.

As described above, according to the seventh embodiment, noise and a significant signal are separated by comparing an average value and input pixel value, and a noise removal effect is effective to lower frequency components by generating substitute data from the downsized image. Also, the number of substitute pixels near an edge is increased using a region-dependent average value, the effective range of the noise removal effect can be broadened, and a higher noise removal effect can be obtained by a simple operation without any adverse effects.

In the seventh embodiment, a pixel average in the window is used to determine a region. However, the present invention is not limited to such specific process. For example, the value of a pixel which is located at the center upon arranging pixels in the window in descending order of pixel value, or the central value of a pixel range in the window may be used. Also, the second largest or smallest value may be used as a substitute pixel candidate in place of the average value of each region.

Eighth Embodiment

The eighth embodiment of the present invention will be described in detail hereinafter with reference to the accompanying drawings.

In the eighth embodiment, in a window in which the difference between the average values of two regions is small, an intra-window average value is determined as substitute data. The eighth embodiment corresponds to the second embodiment that has been explained using FIGS. 5 to 7.

Figure 20:
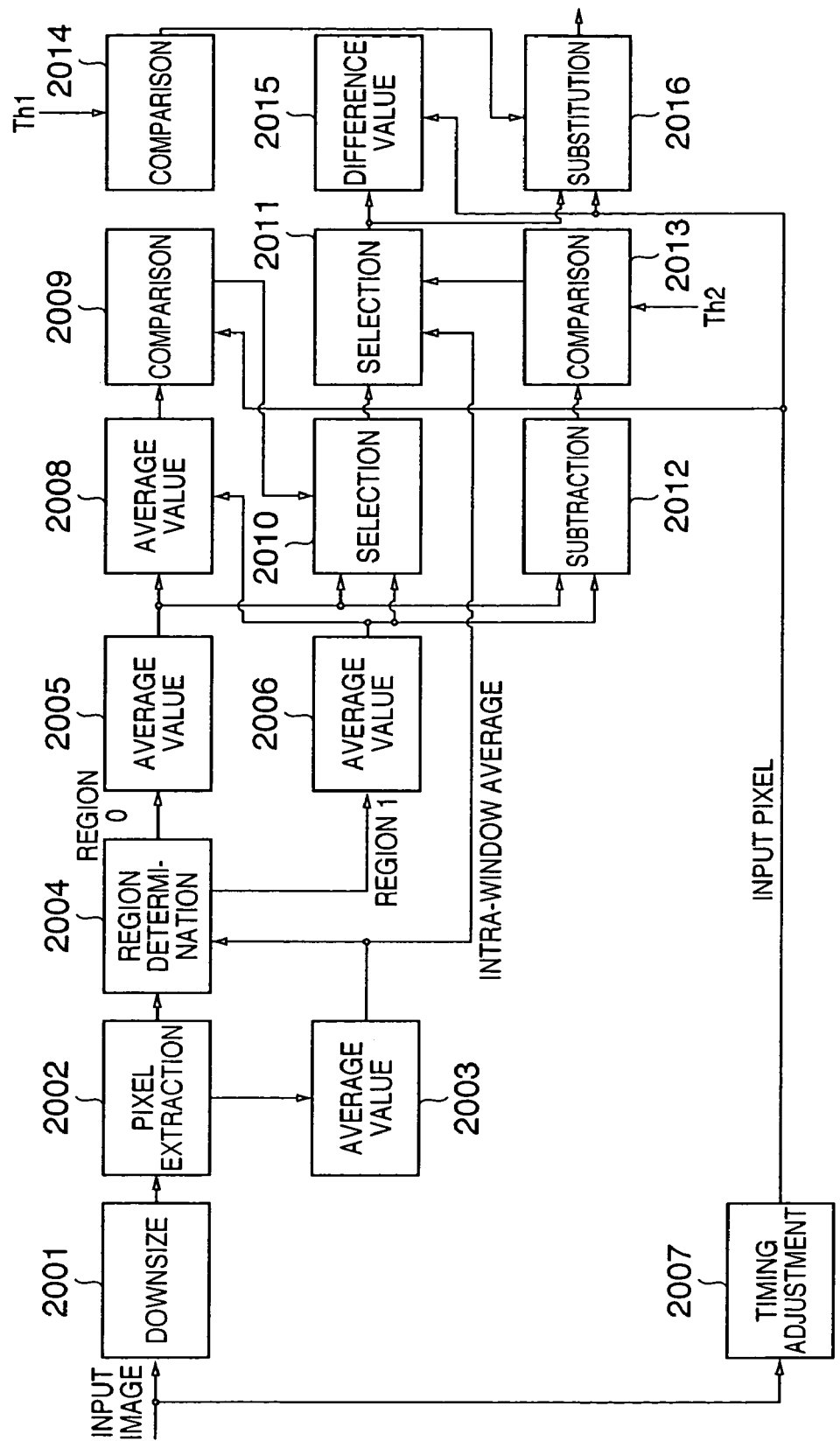
FIG. 20 is a block diagram showing the arrangement of an image processing apparatus according to the eighth embodiment.

FIG. 20 is a block diagram showing the arrangement of an image processing apparatus according to the eighth embodiment. Referring to FIG. 20, reference numerals 2001 to 2006 and 2007 denote units which execute the same processes as those of the units 1401 to 1406 and 1410 shown in FIG. 14 in the seventh embodiment, and a detailed description thereof will be omitted. Reference numeral 2008 denotes an average value calculation unit; 2009, 2013, and 2014, comparison units; 2010 and 2011, selection units; 2012, a subtraction unit; 2015, a difference value generation unit; and 2016, a pixel substitution unit. Only differences from the seventh embodiment will be explained below.

The average value calculation unit 2008 calculates an average value of those of regions 0 and 1. That is, let A0 be the average value of region 0, and A1 be that of region 1. Then, an average value A01 of regions 0 and 1 is given by A01=(A0+A1)/2. The comparison unit 2009 compares the average value A01 of regions 0 and 1 with an input pixel value Pi. If the input pixel value Pi is smaller than or equal to or smaller than the average value A01 of regions 0 and 1, the selection unit 2010 outputs the average value A0 of region 0; otherwise, it outputs the average value A1 of region 1. More specifically, the selection unit 2010 selects the average value closer to the input pixel value Pi. The subtraction unit 2012 calculates a difference D10 between the average values of regions 0 and 1, and the comparison unit 2013 compares the difference D10 with a threshold value Th2. If the difference D10 is equal to or smaller than the threshold value Th2, the selection unit 2011 outputs an intra-window average value Aw; otherwise, it outputs the output from the selection unit 2010, i.e., the average value closer to the input pixel value Pi. That is, the output from the selection unit 2011 is used as substitute data. Since A1>A0, the difference D10 between the average values of regions 0 and 1 is calculated by D10=A1−A0.

The difference value generation unit 2015 generates a difference absolute value Dt between the input pixel value Pi and the output (substitute data) from the selection unit 2011. The comparison unit 2014 compares this difference absolute value Dt with a threshold value Th1. Only when the difference absolute value Dt is smaller than or equal to or smaller than the threshold value Th1, the pixel substitution unit 2016 substitutes the input pixel value Pi by the output (substitute data) from the selection unit 2011. Otherwise, the pixel substitution unit 2016 outputs the input pixel value Pi intact.

The process of the image processing apparatus in the eighth embodiment will be described below. The eighth embodiment executes the same processes as those in steps S1701 to S1704 in FIG. 17 in the seventh embodiment. Also, a substitute data generation process (S1705) and substitution process (S1706) are the same as those in the second embodiment, which have been explained using FIGS. 6 and 7, and a description thereof will be omitted.

As described above, according to the eighth embodiment, as in the second embodiment, in a window in which the difference between the average values of the two regions is small, an intra-window average value is selected as substitute data. Hence, a noise removal effect on a flat portion can be enhanced, and the process can be simple.

Ninth Embodiment

The ninth embodiment of the present invention will be described in detail hereinafter with reference to the accompanying drawings.

In the ninth embodiment, in the substitute data generation process explained in the eighth embodiment, the average value of two regions is output as substitute data in accordance with a random number generated by a random number generation unit. The ninth embodiment corresponds to the third embodiment explained using FIGS. 8 and 9.

Figure 21:
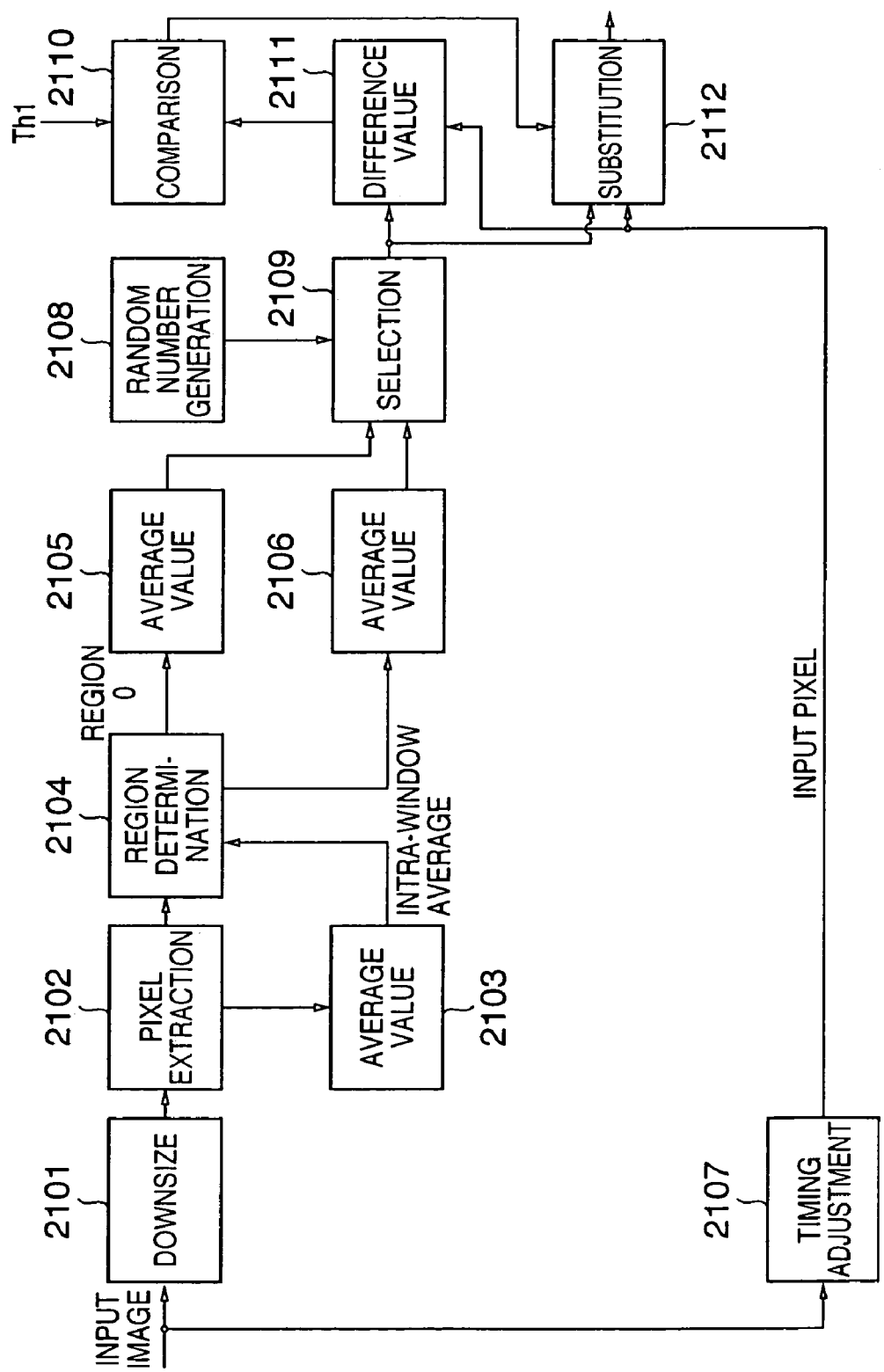
FIG. 21 is a block diagram showing the arrangement of an image processing apparatus according to the ninth embodiment.

FIG. 21 is a block diagram showing the arrangement of an image processing apparatus according to the ninth embodiment. Referring to FIG. 21, reference numerals 2101 to 2107 and 2110 to 2112 denote units which execute the same processes as those of the units 2001 to 2007 and 2014 to 2016 shown in FIG. 20 in the eighth embodiment, and a detailed description thereof will be omitted. Reference numeral 2108 denotes a random number generation unit; and 2109, a selection unit. Only differences from the eighth embodiment will be explained below.

The random number generation unit 2108 generates a pseudo random number by a known method, and controls the selection unit 2109 to randomly select the average value of region 0 or 1 as substitute data. The difference value generation unit 2111 generates a difference absolute value Dt between an input pixel value Pi and the output (substitute data) from the selection unit 2109. The comparison unit 2110 compares this difference absolute value Dt with a threshold value Th1. Only when the difference absolute value Dt is smaller than or equal to or smaller than the threshold value Th1, the pixel substitution unit 2112 substitutes the input pixel value Pi by the output (substitute data) from the selection unit 2109. Otherwise, the pixel substitution unit 2112 outputs the input pixel value Pi intact.

Note that the process of the ninth embodiment is substantially the same as that of the eighth embodiment, and a substitute data generation process is the same as that in the third embodiment described using FIG. 9.

As described above, according to the ninth embodiment, as in the third embodiment, since the region 0 or 1 average value is randomly selected as substitute data, low-frequency noise is modulated to the high-frequency side by a random number, thus obtaining a noise removal effect due to the MTF of a display system or visual sense. Also, the process is further simplified. Since the frequency characteristics of a random number shift to the high-frequency range side by limiting the 0 or 1 runlength of the aforementioned random number output, a more effective noise removal effect can be obtained.

10th Embodiment

The 10th embodiment of the present invention will be described in detail hereinafter with reference to the accompanying drawings.

In the 10th embodiment, pixels in a window are randomly selected in accordance with a random number generated by a random number generation unit, and the selected pixel is output as substitute data. The 10th embodiment corresponds to the fourth embodiment that has been explained using FIGS. 10 and 11.

Figure 22:
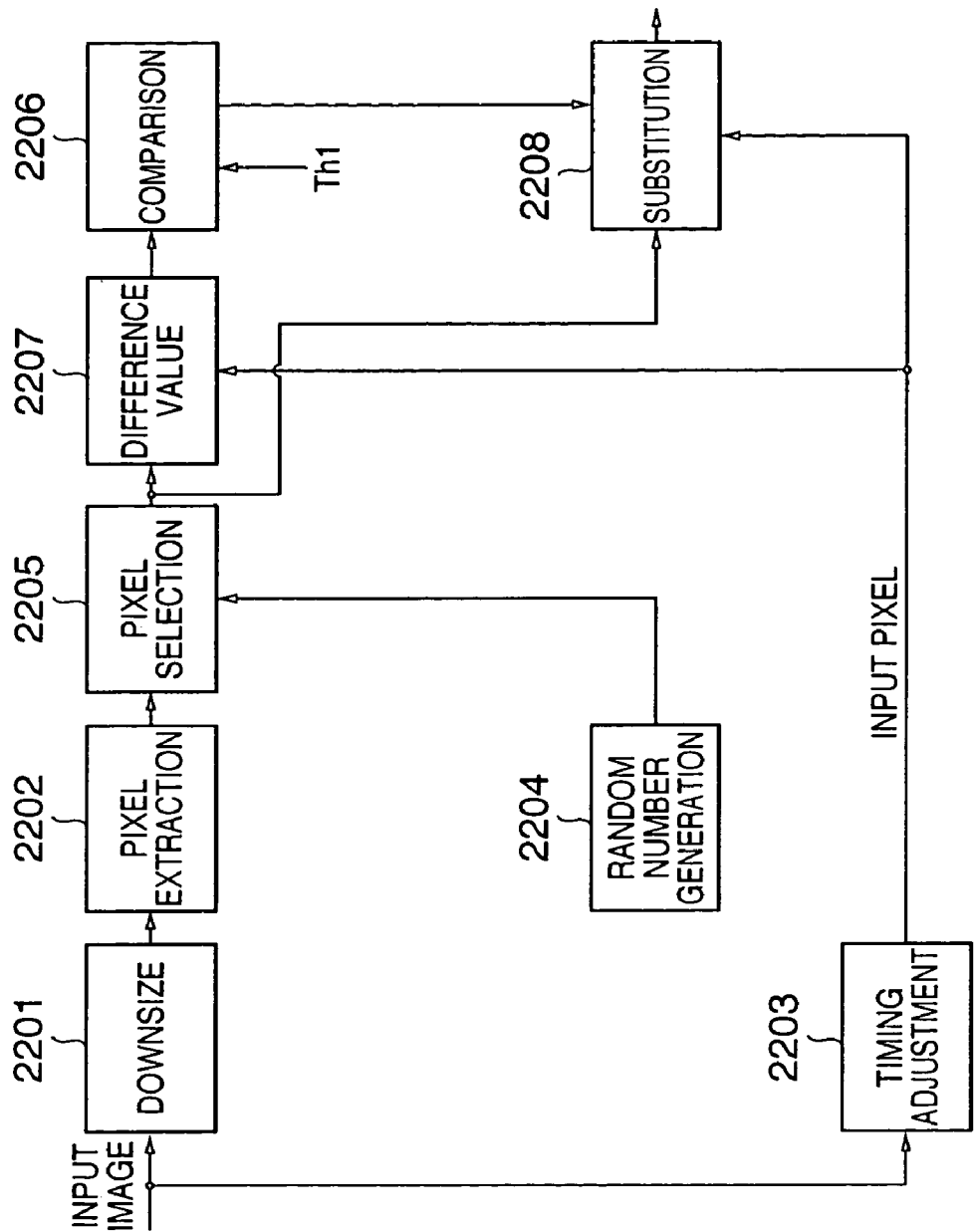
FIG. 22 is a block diagram showing the arrangement of an image processing apparatus according to the 10th embodiment.

FIG. 22 is a block diagram showing the arrangement of an image processing apparatus according to the 10th embodiment. Referring to FIG. 22, reference numerals 2201, 2202, and 2203 denote the same units as the image reduction unit, pixel extraction unit, and timing adjustment unit in the seventh to ninth embodiments; 2206 to 2208, the same units as the comparison unit, difference value generation unit, and pixel substitution unit in the eighth and ninth embodiments. Hence, a description of these units will be omitted. Reference numeral 2204 denotes a random number generation unit; and 2205, a pixel selection unit. Only differences from the aforementioned embodiments will be described below.

As in the ninth embodiment, the random number generation unit 2204 generates a pseudo random number by a known method, and controls the pixel selection unit 2205 to randomly select a pixel in the window as substitute data. As in the eighth and ninth embodiments, the difference value generation unit 2207 generates a difference absolute value Dt between an input pixel value Pi and the output (substitute data) from the pixel selection unit 2205. The comparison unit 2206 compares this difference absolute value Dt with a threshold value Th1. Only when the difference absolute value Dt is smaller than or equal to or smaller than the threshold value Th1, the pixel substitution unit 2208 substitutes the input pixel value Pi by the output (substitute data) from the pixel selection unit 2205. Otherwise, the pixel substitution unit 2208 outputs the input pixel value Pi intact.

If the window size in the 10th embodiment is 4×4, since the number of pixels in the window is 16, a random number is expressed by 4 bits.

A 9-bit M-sequence pseudo random code generation circuit and the random number generation unit 2204 are the same as those in the fourth embodiment described using FIG. 11, and a description thereof will be omitted.

As described above, according to the 10th embodiment, as in the fourth embodiment, since a pixel in the window is randomly selected as substitute data, low-frequency noise is modulated to the high-frequency side by the generated random number although a simple arrangement is adopted, thus obtaining a high noise removal effect due to the MTF of a display system or visual sense. Since the random number output is inverted or non-inverted as an input pixel is updated, the frequency characteristics of a random number shift to the high-frequency range side, and a higher noise removal effect can be obtained.

11th Embodiment

The 11th embodiment of the present invention will be described in detail hereinafter with reference to the accompanying drawings.

In the 11th embodiment, an input image is categorized into a plurality of categories, and substitute data according to the categories are generated. The 11th embodiment corresponds to the fifth embodiment that has been explained using FIG. 12.

Figure 23:
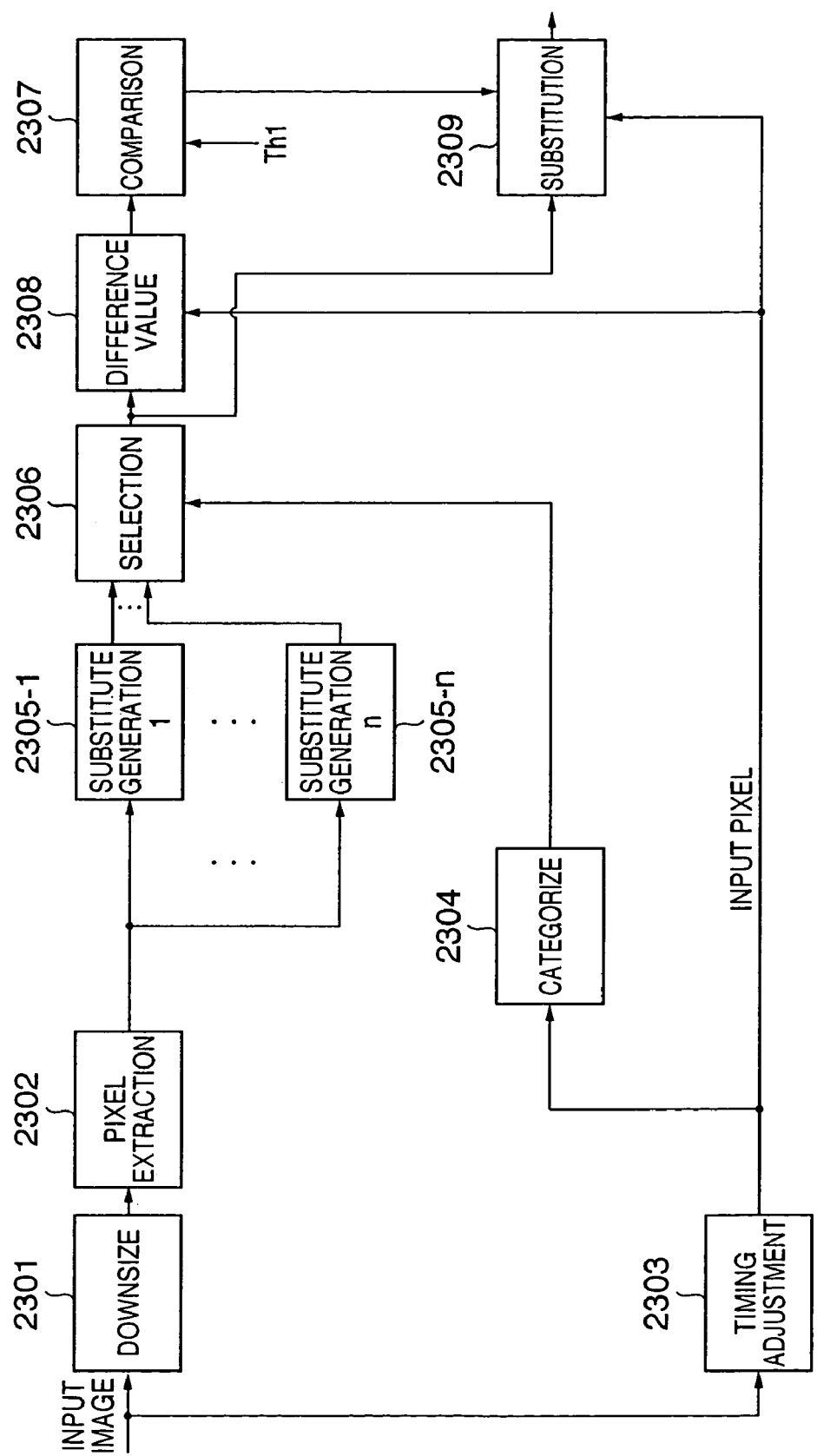
FIG. 23 is a block diagram showing the arrangement of an image processing apparatus according to the 11th embodiment.

FIG. 23 is a block diagram showing the arrangement of an image processing apparatus according to the 11th embodiment. Referring to FIG. 23, reference numerals 2301 to 2303 and 2307 to 2309 denote units which execute the same processes as those of the units 2201 to 2203 and 2206 to 2208 shown in FIG. 22 in the 10th embodiment, and a description thereof will be omitted. Reference numeral 2304 denotes a categorize unit; 2305, substitute data generation units; and 2306, a substitute data selection unit. Only differences from the 10th embodiment will be explained below.

The categorize unit 2304 categorizes an input image to a plurality of categories. The substitute data generation units 2305 generate substitute data for noise removal using a plurality of algorithms or a plurality of different threshold values, which have been explained in the seventh to 10th embodiments. The substitute data selection unit 2306 selects substitute data suited to a given category in accordance with the category. After that, the same determination process as in the 10th embodiment is executed, and an input pixel is substituted to remove noise.

Note that categories are defined with reference to, e.g., a portion that may produce an adverse effect if it undergoes a substitution process, a portion where low-frequency noise is conspicuous, a portion where high-frequency noise is conspicuous, a portion where both low-frequency noise and high-frequency noise are conspicuous, and the like. Especially, in the seventh to 10th embodiments, adverse effects appear in different ways, and these embodiments have compatibility to input images.

For example, the 10th embodiment is suitable for a portion having fine texture like cloth since good appearance can be maintained without any average process. The eighth embodiment is suitable for a dark portion since appearance can be improved by the average process. Furthermore, noise appears in different ways depending on the gamut of an input pixel. Also, a level difference which is recognized as a flat portion differs. Hence, an optimal value of the threshold value Th2 in the eighth embodiment varies.

As described above, according to the 11th embodiment, substitute data are generated using a plurality of algorithms (including threshold value control), and substitute data suited to a category is selected to substitute an input pixel. Hence, a high noise removal effect can be obtained while minimizing adverse effects.

12th Embodiment

The 12th embodiment of the present invention will be described in detail hereinafter with reference to the accompanying drawings.

In the 12th embodiment, a threshold value selection unit for selecting one of a plurality of threshold values in accordance with a category is added to the 11th embodiment.

Figure 24:
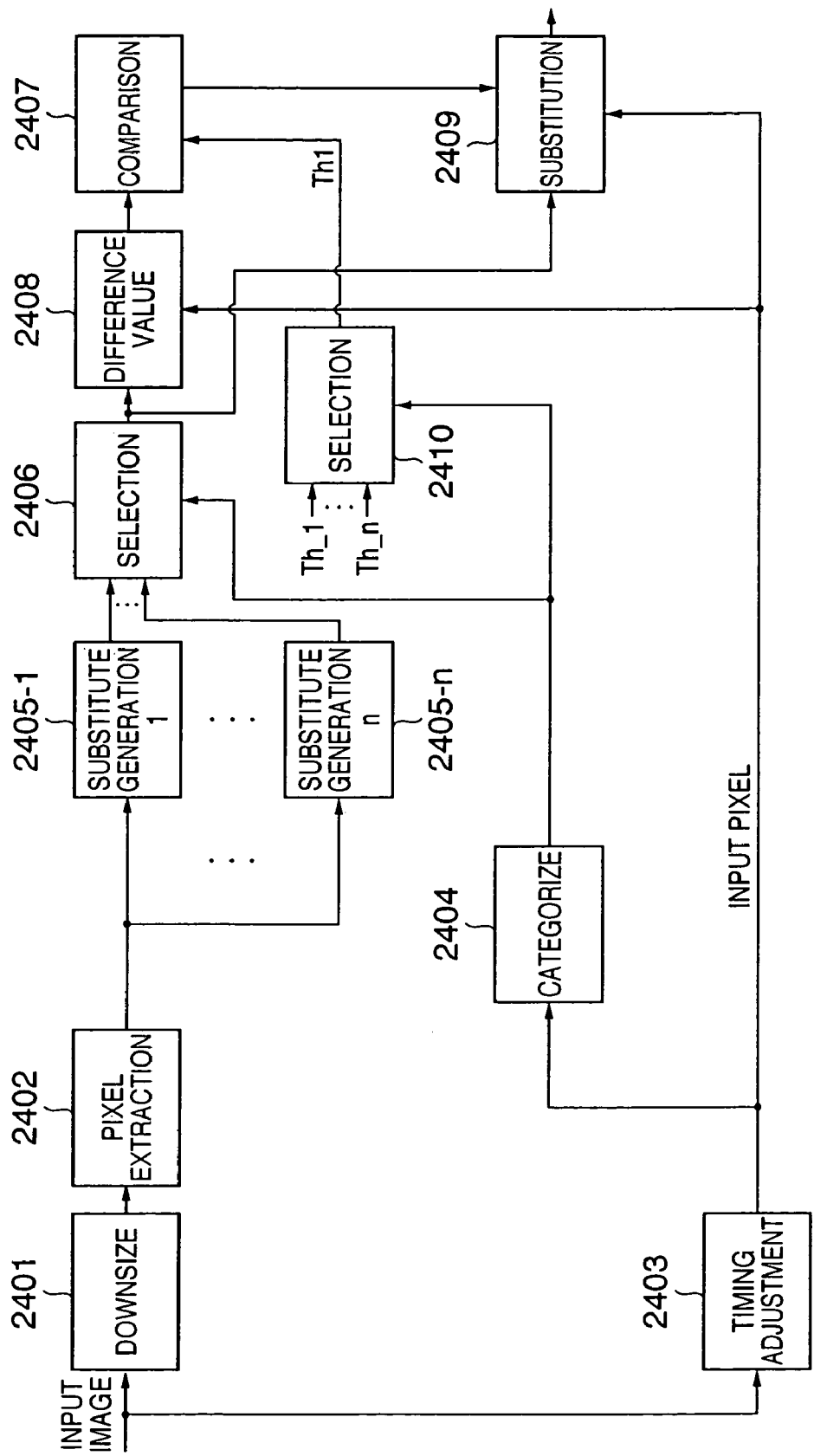
FIG. 24 is a block diagram showing the arrangement of an image processing apparatus according to the 12th embodiment.

FIG. 24 is a block diagram showing the arrangement of an image processing apparatus according to the 12th embodiment. Referring to FIG. 24, reference numerals 2401 to 2409 denote units which execute the same processes as those in FIG. 23 in the 11th embodiment, and a description thereof will be omitted. Reference numeral 2410 denotes a threshold value selection unit. Only differences from the 11th embodiment will be described below.

The categorize unit 2404 categorizes an input image to a plurality of categories. The threshold value selection unit 2410 selects a threshold value Th1 suited to the selected category in accordance with the selected category. After that, the same determination process as in the 11th embodiment is executed, and an input pixel is substituted to remove noise.

Note that categories are defined with reference to the ways adverse effects appear upon executing a substitution process. That is, a large threshold value is selected for a portion where adverse effects are inconspicuous so as to enhance the noise removal effect, and a small threshold value is selected for a portion where adverse effects are conspicuous so as to obscure adverse effects.

Furthermore, when an input gain is varied by AGC (Auto Gain Control) or the like, since the noise gain (amplitude) is also varied, it is desirable to also change the threshold value Th1 in correspondence with the input gain.

In the 12th embodiment, a plurality of substitute data generation units and threshold values have been explained in correspondence with each other. However, the present invention is not limited to such specific arrangement, and the number of substitute data generation units may be different from that of threshold values. For example, one substitute data generation unit may generate substitute data. In this case, the substitute data selection unit 2406 is omitted.

As described above, according to the 12th embodiment, since a threshold value is selected according to the category upon substituting an input pixel, a high noise removal effect can be obtained while minimizing adverse effects.

13th Embodiment

The 13th embodiment of the present invention will be described in detail hereinafter with reference to the accompanying drawings.

In the 13th embodiment, a downsized image generated by the downsized image generation unit 1504 in the image downsize unit 1401 shown in FIG. 15 in the seventh to 12th embodiments is fed back to the block segmentation unit 1501 to repetitively generate a downsized image.

Figure 25:
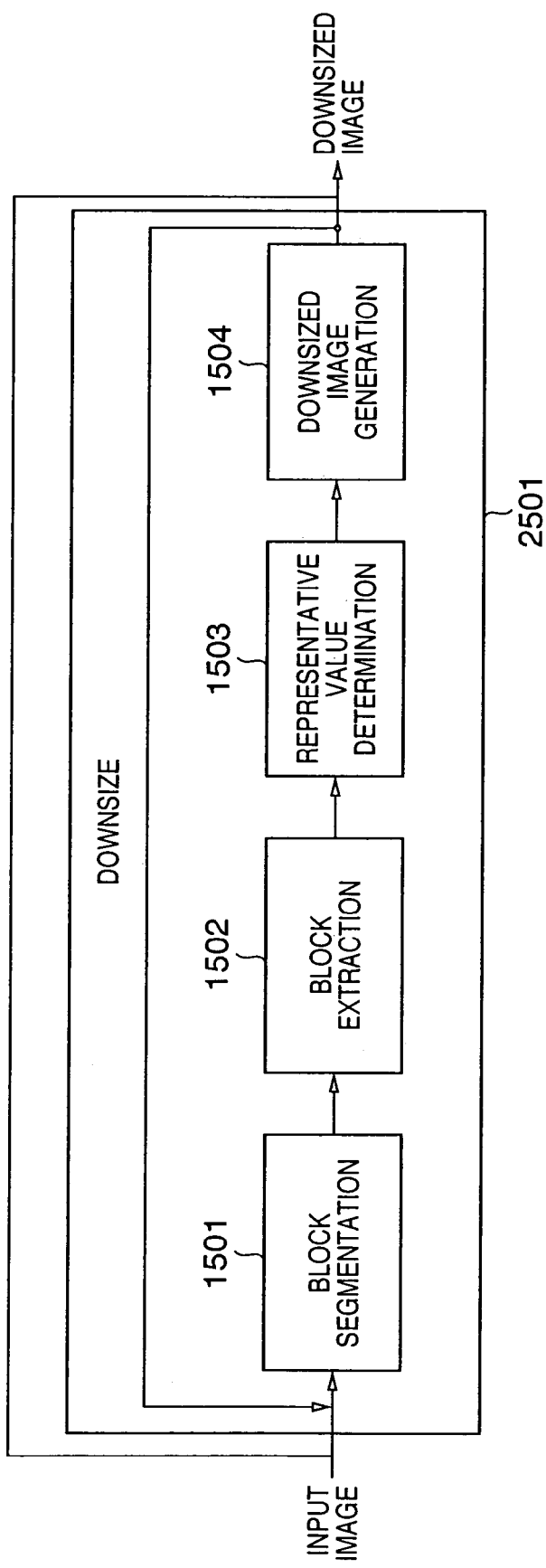
FIG. 25 is a block diagram showing the arrangement of an image downsize unit 2501 in the 13th embodiment.

FIG. 25 is a block diagram showing the arrangement of an image downsize unit 2501 in the 13th embodiment. Only differences from the seventh to 12th embodiments will be described below.

When an image is input to the image downsize unit 2501, a downsized image is output, as has been explained in the seventh embodiment. In the 13th embodiment, the downsized image is input to the image downsize unit 2501 at least once to generate another downsized image. Assume that the downsize scale is ¼. When an input image is input to the image downsize unit 2501, a first downsized image, which is downsized to ¼, is obtained. When this first downsized image is input to the image downsize unit 2501 while the downsize scale=¼, a second downsized image, which is further downsized to ¼, can be obtained. The second downsized image can be obtained as a 1/16 downsized image of the input image. That is, let M be the downsize scale, and N be the number of input times of the obtained downsized image to the image downsize unit. Then, a downsized image, which is downsized to $M^{(N+1)}$ to an input image, can be obtained.

In the seventh embodiment as well, a downsize amount equivalent to that in the 13th embodiment can be realized by setting a downsize scale=$M^{(N+1)}$. When the downsize scale is fixed, a desired downsize scale can be achieved by repeating a process a plurality of number of times as in the 13th embodiment.

Upon repeating the process, as described above, a downsize scale may be changed.

From the finally obtained downsized image, downsized pixels in a predetermined pattern (window) having a downsized pixel corresponding to the position of an input pixel (pixel of interest) as the center are extracted, and noise removal is implemented by the method explained in the seventh to 12th embodiments.

As described above, according to the 13th embodiment, a high noise removal effect can be obtained while minimizing adverse effects.

14th Embodiment

The 14th embodiment of the present invention will be described in detail hereinafter with reference to the accompanying drawings.

The 14th embodiment removes noise using a filter before an image downsize unit downsizes an input image.

Figure 26:
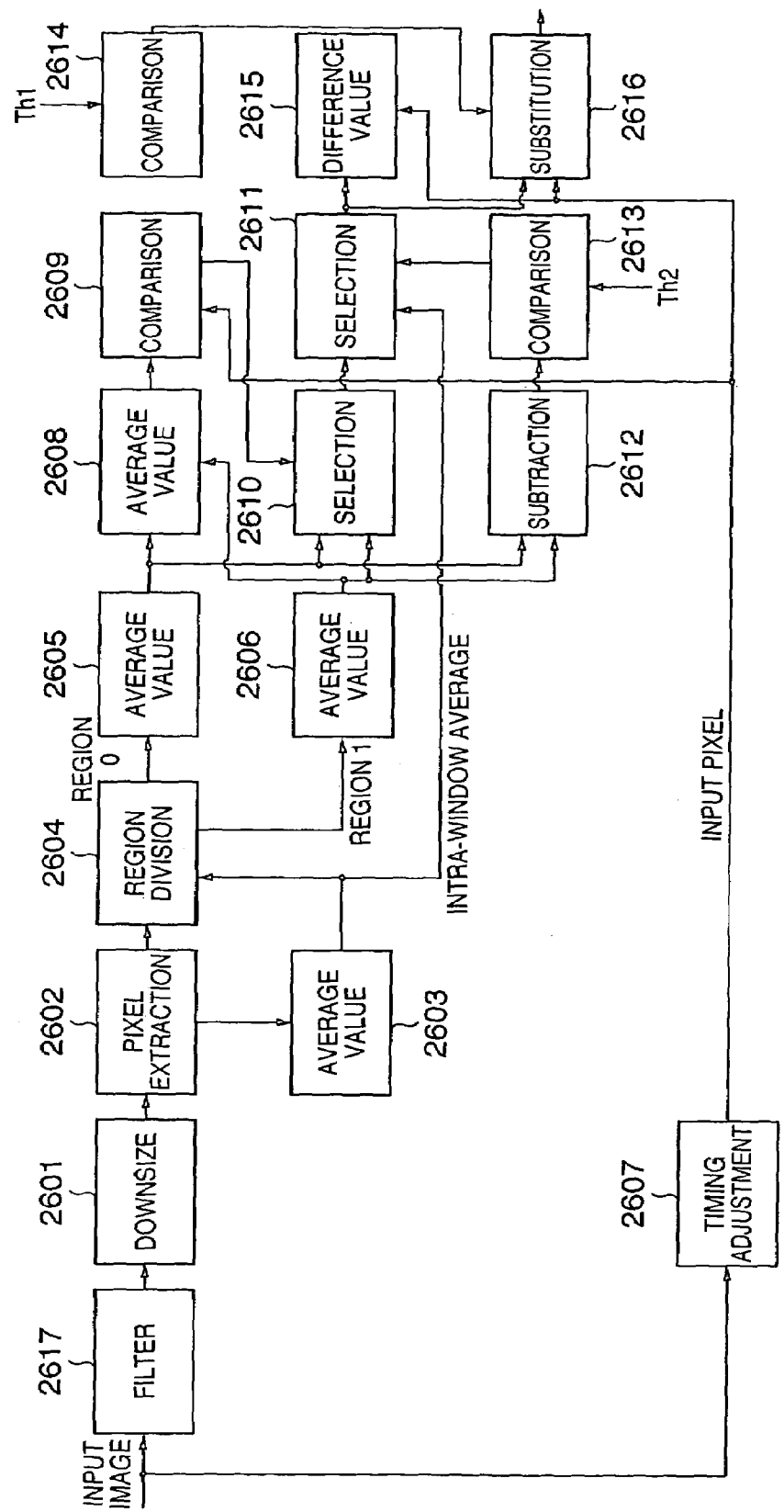
FIG. 26 is a block diagram showing the arrangement of an image processing apparatus according to the 14th embodiment.

FIG. 26 is a block diagram showing the arrangement of an image processing apparatus according to the 14th embodiment. Only differences from the image processing apparatus (FIG. 20) in the eighth embodiment will be explained below.

In the 14th embodiment, as shown in FIG. 26, a filter unit 2617 applies a filter process to an input image before that input image is input to an image downsize unit 2601. For example, FIG. 27A shows a block which is formed of a total of nine (3×3) pixels of an input image. A pixel of black paint at the center of this block is used as a pixel of interest which is to be corrected by a filter. The 3×3 pixels undergo a process using a filter which is formed of a total of nine (3×3) pixels shown in FIG. 27B. Note that the pixels of the filter shown in FIG. 27B respectively correspond to those of the block shown in FIG. 27A, and values in the filter indicate weighting coefficients of respective pixels.

Note that the respective pixels of the block are multiplied by the corresponding weighting coefficients of the filter, and a sum total of these products is divided by a total of the weighting coefficients of the filter to obtain a smoothed value of the pixel of interest. FIG. 27C shows the smoothed value of the pixel of interest. With this smoothing process, high-frequency noise can be removed.

A smoothed image of an input image is input to the image downsize unit 2601, and in the subsequent processes, low-frequency noise is removed by the method explained in the seventh to 13th embodiments.

Alternatively, the filter unit 2617 may output a plurality of smoothed images, which are input to the image downsize unit 2601, and downsized images of the smoothed images may be generated by the method explained in the seventh embodiment. Then, by determining a representative value from identical pixels of the plurality of downsized images, another downsized image may be generated from the plurality of downsized images.

As the method of determining the representative value, a method of randomly selecting the representative value by a random number, a method of selecting a mode value, and a method of selecting a median are available. In addition to these methods, a method of calculating a difference value from a corresponding input pixel, and selecting a value which is equal to or smaller than a predetermined threshold value and is closest to the threshold value as a representative value may be used.

As a method of generating a plurality of smoothed images, different smoothed images can be generated by changing the weighting coefficients shown in FIG. 27B. For example, the weighting coefficients of pixels around the pixel of interest are set to be 0.25 in FIG. 27B. Alternatively, by setting a value larger than 0.25, a strongly smoothed image can be obtained compared to that obtained using FIG. 27B. Also, by setting a value smaller than 0.25, a weakly smoothed image can be obtained compared to that obtained using FIG. 27B.

The filter can remove high-frequency noise, while it may also smooth an edge portion. Determining a representative value from the plurality of smoothed images is suited to preserve edge information.

As the filter, a known low-pass filter may be used in place of the aforementioned filter.

As described above, according to the 14th embodiment, high-frequency noise removal can be effectively attained, and a high noise removal effect can be obtained while minimizing adverse effects.

According to the seventh to 14th embodiments described above, noise and a significant signal are separated by comparing an average value and input pixel value, and a noise removal effect is effective to lower frequency components by generating substitute data from the downsized image. Also, the number of substitute pixels near an edge is increased using a region-dependent average value, the effective range of the noise removal effect can be broadened, and a higher noise removal effect can be obtained by a simple operation without any adverse effects. Especially, the capacity of a line memory required for the process can be greatly reduced.

In a window in which the difference between two region averages is small, an intra-window average value is selected as substitute data, thus enhancing a noise removal effect on a flat portion, and simplifying the process.

A region 0 or 1 average value is randomly selected as substitute data, thus modulating low-frequency noise to the high-frequency side by a random number, and obtaining a noise removal effect due to the MTF of a display system or visual sense. Also, the process is further simplified.

A pixel in a window of the downsized image is randomly selected as substitute data, thus obtaining a high noise removal effect while modulating low-frequency noise to the high-frequency side without impairing details.

Substitute data are generated by a plurality of algorithms including threshold value control, and substitute data is selected in correspondence with a category to substitute a input pixel, thus obtaining a high noise removal effect which matches image characteristics while minimizing adverse effects.

A threshold value is selected in correspondence with a category to substitute a input pixel, thus obtaining a high noise removal effect which matches image characteristics while minimizing adverse effects.

By repeating a downsize process a plurality of number of times, a desired downsized image can be easily generated, and an effective noise removal effect can be obtained.

Since a downsized image is generated based on an image smoothed using a filter, and substitute data is generated based on the downsized image, a high noise removal effect suited to high-frequency noise removal is obtained.

Another Embodiment

The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which stores the program code constitutes the present invention.

As the recording medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

Note that the present invention can also be applied to a case wherein a program of software that implements the functions of the aforementioned embodiment is delivered from a storage medium that stores the program code of the software to a demander via a communication line such as a personal computer communication or the like.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
    means for obtaining an image of a predetermined scale from an input image;
    means for extracting, from the obtained image, pixels in a window which corresponds to a position of an input pixel and has a predetermined size;
    means for generating a random number;
    means for selecting a pixel from the extracted pixels, based on the generated random number;
    means for calculating a difference value between a value of the selected pixel and the value of the input pixel;
    means for comparing the difference value with a first threshold value; and
    means for, when the difference value is less than the first threshold value, substituting the value of the input pixel with the value of the selected pixel.

2. The apparatus according to claim 1, wherein the generated random number forms a uniform probability distribution.

3. The apparatus according to claim 1, wherein the generated random number forms a probability distribution depending on the distance from a pixel corresponding to an input pixel in the window.

4. An image processing method comprising:
    a step of obtaining an image of a predetermined scale from an input image;
    a step of extracting, from the obtained image, pixels in a window which corresponds to a position of an input pixel and has a predetermined size;
    a step of generating a random number;
    a step of selecting a pixel from the extracted pixels, based on the generated random number;
    a step of calculating a difference value between a value of the selected pixel and the value of the input pixel;
    a step of comparing the different value with a first threshold value; and
    a step of, when the difference value is less than the first threshold value, substituting the value of the input pixel with the value of the selected pixel.

5. The method according to claim 4, wherein the generated random number forms a uniform probability distribution.

6. The method according to claim 4, wherein the generated random number forms a probability distribution depending on the distance from a pixel corresponding to an input pixel in the window.

7. A computer-readable recording medium recording a program for causing a computer to execute an image processing method of claim 4.

* * * * *